(12) United States Patent
Uehara et al.

(10) Patent No.: US 7,450,239 B2
(45) Date of Patent: Nov. 11, 2008

(54) OPTICAL PULSE EVALUATION DEVICE AND IN-SERVICE OPTICAL PULSE EVALUATION DEVICE

(75) Inventors: Noboru Uehara, Aichi (JP); Yuichi Takushima, Tokyo (JP); Yasuyuki Ozeki, Tokyo (JP); Yoichi Hirota, Tokyo (JP)

(73) Assignee: Santec Corporation, Aichi (JP)

( * ) Notice: Subject to any disclaimer, the term of this patent is extended or adjusted under 35 U.S.C. 154(b) by 268 days.

(21) Appl. No.: 11/094,168

(22) Filed: Mar. 31, 2005

(65) Prior Publication Data

US 2005/0219543 A1 Oct. 6, 2005

(30) Foreign Application Priority Data

Mar. 31, 2004 (JP) ............................. 2004-103835
Mar. 3, 2005 (JP) ............................. 2005-059559

(51) Int. Cl.
*G01N 21/00* (2006.01)
*G01B 9/02* (2006.01)
*G01J 3/45* (2006.01)

(52) U.S. Cl. ..................... 356/451; 356/73.1; 356/450

(58) Field of Classification Search ............... 356/450, 356/451, 452, 484, 121, 122, 213, 73.1
See application file for complete search history.

(56) References Cited

U.S. PATENT DOCUMENTS 4,638,493 A * 1/1987 Bishop et al. ............... 375/132
5,661,554 A * 8/1997 Calvani et al. .............. 356/73.1
6,008,899 A * 12/1999 Trebino et al. .............. 356/450
6,611,336 B1 * 8/2003 Walmsley et al. ........... 356/450

OTHER PUBLICATIONS

Iaconis et al., "Spectral phase interferometry for direct electric-field reconstruction of ultrashort optical pulses," May 15, 1998, Optics Letters, vol. 23, No. 10, pp. 792-794.*
Iaconis and Walmsley, "Self-Referencing Spectral Interferometry for Measuring Ultrashort Optical Pulses," Apr. 1999, IEEE Journal of Quantum Electronics, vol. 35, No. 4, pp. 501-509.*
Londero et al., "Measuring ultrafast pulses in the near-ultraviolet using spectral phase interferometry for direct electric field reconstruction," 2003, Journal of Modern Optics, vol. 50, No. 2, pp. 179-184.*

(Continued)

*Primary Examiner*—Patrick Connolly
*Assistant Examiner*—Scott M Richey
(74) *Attorney, Agent, or Firm*—Cheng Law Group PLLC

(57) ABSTRACT

An optical pulse evaluation device and an in-service optical pulse evaluation device is disclosed which are capable of characteristics evaluation of an optical pulse itself or a sample launched therein in a relatively high bit-rate region. The optical pulse evaluation device evaluates a pulse waveform expressing an optical intensity of the optical pulse, an instantaneous frequency of the optical pulse, or a modulated light prepared by modulating the optical pulse in a light source end. The optical pulse evaluation device also observes a waveform change after a known optical pulse is passed through a device such as an optical fiber to evaluate a waveform deterioration or a compensation behavior caused by the device. The in-service optical pulse evaluation device is capable of measuring a wavelength dispersion in an optical communication.

11 Claims, 15 Drawing Sheets

OTHER PUBLICATIONS

Kersey et al., "Fiber Grating Sensors," Aug. 1997, Journal of Lightwave Technology, vol. 15, No. 8, pp. 1442-1463.*

Chu et al., "Direct measurement of the spectral phase of femtosecond pulses," Apr. 15, 1995, Optics Letters, vol. 20, No. 8, pp. 904-906.*

Dorrer et al., "Direct space-time characterization of the electric fields of ultrashort optical pulses," Apr. 1, 2002, Optics Letters, vol. 27, No. 7, pp. 548-550.*

Walmsley and Wong, "Characterization of the electric field of ultrashort optical pulses," Nov. 1996, Journal of the Optical Society of America B, vol. 13, No. 11, pp. 2453-2463.*

Dorrer and Walmsley, "Accuracy criterion for ultrashort pulse characterization techniques," May 2002, J. Opt. Soc. Am. B, vol. 19, No. 5, pp. 1019-1029.*

* cited by examiner

OPTICAL PULSE EVALUATION DEVICE AND IN-SERVICE OPTICAL PULSE EVALUATION DEVICE

FIELD OF THE INVENTION

The present invention relates to an optical pulse evaluation device for evaluating a waveform of an optical pulse and an in-service optical pulse evaluation device. More specifically, the present invention relates to the optical pulse evaluation device for evaluating a pulse waveform expressing an optical intensity of the optical pulse, an instantaneous frequency of the optical pulse, or a modulated light prepared by modulating the optical pulse in a light source end, and for observing a waveform change after a known optical pulse is passed through a device such as an optical fiber to evaluate a waveform deterioration or a compensation behavior caused by the device, and an in-service optical pulse evaluation device capable of measuring a wave length dispersion in an optical communication.

BACKGROUND OF THE INVENTION

In recent years, a semiconductor laser for outputting a laser light is developing rapidly and, also, an optical transmission rate is increasing rapidly. At the same time, in a region between relatively high bit-rates, in which the optical transmission rate becomes a range form 125 Mbit/s (megabits/second) to 40 G (giga) or more bits/s, the optical pulse is increasingly used in a variety of optical communication technologies. Particularly, an increase in a communication using a high bit-rate of 40 G or more bits/s in the future is expected. In the high bit-rate region, an optical pulse width becomes a ps (pico second $10^{-12}$) or shorter order.

As a rule, the optical fiber for sending the optical pulse produces group velocity dispersion, self phase modulation, and polarization mode dispersion to cause the waveform deterioration of the optical pulse. A higher transmission rate of the optical pulse causes a short pulse width resulting in a serious effect of waveform deterioration of the optical pulse on a signal processing.

The optical pulse evaluation device can evaluate a form of an output waveform and the presence and absence of jitter for the optical pulse having a variety of bit-rates or the optical pulse of the high bit-rate, which are output from an optical pulse generating light source. On the other hand, for a variety of optical components and optical devices such as the optical fiber used in an optical network transmission system, the optical pulse evaluation device evaluates wavelength dispersion, polarization mode dispersion, higher dispersion, and other characteristic of the optical pulse to contribute to developments of optical communication systems and developments of optical components.

On the other hand, conventionally, the optical pulse evaluation device widely uses an approach for evaluation of the optical pulse by using a nonlinear optical effect. The nonlinear optical effect is a phenomenon in which a relation between an electromagnetic field of a laser light and electronic polarization of a matter becomes nonlinear. Methods for evaluation of the optical pulse by using the nonlinear optical effect include (1) auto correlation method, (2) cross correlation method, (3) FROF (frequency resolved optical gating) method, and (4) SPIDER (spectral phase interferometry for direct electric field reconstruction) method.

According to a first proposal of approaches using such the nonlinear optical effect, a measured optical pulse is distinguished from the optical pulse produced by four-wave mixing to eliminate a noise caused by an interference of the measured optical pulse and the optical pulse produced by four-wave mixing. In this way, the optical pulse is measured in a high sensitivity and, also, a spectrogram is divided into two orthogonal light components to evaluate the optical pulse produced by polarized wave dispersion (see, for example, patent document 1.) According to this first proposal, the measured optical pulse is divided into a probe light and a gate light, and a two photon absorption intensity is measured as a function of a delay time and a frequency by using a two photon transition medium, which is one of nonlinear effects.

On the other hand, according to a second proposal, a second harmonic wave of the measured optical pulse is generated by using a nonlinear optical material and, at the same time, a cross correlation signal light, which corresponds to a different frequency of the measured optical light from the second harmonic wave, is generated to convert this cross correlation signal light to an electric signal for displaying its pulse waveform (see, for example, patent document 2.)

Moreover, according to a third proposal, the measured optical pulse is divided into 2 optical pulses, and these 2 optical pulses are launched into a nonlinear optical material by making a delay time and a pulse width and a pulse waveform of the optical pulse are measured by using an optical pulse intensity waveform, which is a correlation data with the delay time, of the second harmonic wave (see, for example, patent document 3 and patent document 4.)

FIG. 1 shows a configuration of the optical pulse evaluation device according to this third proposal. This figure expresses the outline of the device disclosed in patent document 3. Measured light 11 is launched into interferometer 12 to go to an auto correlation signal detection unit 13. Interferometer 12 divides measured light 11 into 2 optical pulses 16 and 17 by using first and second parallel flat plates 14 and 15 to make an optical path difference between them. This optical path difference can be changed by driving unit 18 housed in interferometer 12. Auto correlation signal detection unit 13 measures a time correlation between 2 optical pulses 16 and 17 launched from interferometer 12 to calculate the optical pulse width of measured light 11.

Patent document 4 in the third proposal is same as patent document 3 in the point that measured light 11 is divided to delay the one optical pulse, and then, the correlated signals are measured after convoluting. However, in this document, a wavelength of the optical pulse is dispersed before measured light 11 is launched. In conclusion, patent document 4 uses an approach of measuring the optical pulse width by applying the auto correlation method and the nonlinear optical effect.

According to patent document 4, the optical path difference between 2 light paths is made by using a Mach-Zehnder interferometer, these light paths are converted to the electric signals by a light receiver, and a signal processing is carried out for each spectrum by using a frequency intensity analyzer to obtain an auto correlation (see, for example, patent document 5.)

FIG. 2 shows the configuration of the optical pulse evaluation device according to the fourth proposal. The light emitted from light source 21 is divided by first half mirror 23. The light passed through first half mirror 23 produces the predetermined frequency difference by frequency converter 24 and passes through second half mirror 25 to be input to light receiver 26. The light reflected by first half mirror 23 is delayed by photodelay device 27 followed by reflection by second half mirror 25 to be input in light receiver 26. Light receiver 26 receives 2 lights, of which frequencies and arrival times differ from each other, to convert to the electric signals finally followed by subjecting to the signal processing for each spectrum by using frequency intensity analyzer 28 located in its output end.

Patent document 1: Japanese Published Unexamined Patent Application No. 2003-28724 (paragraph 0041, FIG. 21)

Patent document 2: Japanese Published Unexamined Patent Application No. 2002-257633 (paragraph 0025, FIG. 2)

Patent document 3: Japanese Published Unexamined Patent Application No. 2001-74560 (paragraph 0081, FIG. 2)

Patent document 4: Japanese Published Unexamined Patent Application No. 2000-356555 (paragraph 0010, FIG. 1)

Patent document 5: Japanese Published Unexamined Patent Application No. 1997-133585 (paragraph 0207, FIG. 1)

In general, carrying out a characteristics evaluation of the pulse width and the pulse waveform of the optical pulse by using the nonlinear optical effect creates the problem in that the sensitivity of the measurement is low and accuracy of measurement is not significantly improved. According to the first proposal, the optical pulse is evaluated by applying the nonlinear optical effect and, thus, accuracy of measurement is limited depending on intensity of an incident electric field. Therefore, the sensitivity of measurement cannot be increased to disturb the characteristics evaluation of the optical pulse in use of the light source having a low power. On the other hand, this proposal creates the problem in that when evaluation of the optical pulse used for high transmission velocity with a high bit-rate is carried out, a high time resolution performance such as pico second or shorter is required as the pulse width of the optical pulse to be evaluated becomes short.

According to the second proposal, the second harmonic wave of the sampling light is generated and, at the same time, a material called pseudo phase matching element is necessarily used through a special procedure for generating a difference frequency light as a cross correlation signal light between the generated second harmonic wave and the measured light. In other words, the second proposal has a constraint for commercialization, if no nonlinear optical material is available to satisfy a phase matching condition for the wavelength of the measured light. On the other hand, this proposal uses also the nonlinear optical effect for evaluation of the optical pulse. Therefore, the sensitivity of the measurement is low to make the characteristics evaluation of the optical pulse inappropriate in use of the light source providing the low power.

The third proposal is same as the first and the second proposals in the point of using the nonlinear optical effect. Hence, measurement depends on the incident electric field to make the sensitivity of the measurement low and, thus, to make the characteristics evaluation of the optical pulse inappropriate in use of the light source providing the low power.

According to the fourth proposal, phase information becomes available by measuring the auto correlation of electric field components of the measured optical pulse and, thus, the auto correlation method is realized allowing a high relative sensitivity and almost no limitation of a measurable wavelength range in a low light intensity. However, according to the fourth proposal, the circuit configuration and a circuit control of frequency intensity analyzer 28 shown in FIG. 2 is complicated and, hence, the measurement can be unstably carried out for a position and a frequency drift of the optical pulse. Therefore, the proposal is inappropriate for evaluating the optical pulse for high velocity transmission, which has a relatively high bit-rate and a small pulse width, highly desired for the characteristics evaluation.

On the other hand, any optical pulse evaluation device cannot observe a spectral intensity to each spectral phase in a region of the optical pulse, which has a relatively high bit-rate, namely, cannot observe an actual pulse waveform.

The spectral phase will now be additionally described below. When a complex notation of an electric field spectrum of the optical pulse is denoted by $E(\omega)$, this can be expressed by the following formula:

$$E(\omega)=|E(\omega)|\exp[i\phi(\omega)] \tag{1}$$

As known from this formula, the complex notation $E(\omega)$ of the electric field spectrum of the pulse can be expressed by a amplitude $|E(\omega)|$ and an argument $\phi(\omega)$. This argument $\phi(\omega)$ is named the spectral phase.

Consequently, in the above described devices conventionally proposed, the intensity of the optical pulse and the pulse width based on a delay processing to be evaluated are obtained. In such conventional optical pulse evaluation devices, the actual pulse waveform of the optical pulse is presumed by applying information obtained about the optical pulse to the form of a standard pulse waveform (for example, an eight and a width of a Gaussian waveform). Such the characteristics evaluation does not allow showing an actual distortion of a waveform which makes high accuracy evaluation impossible for a deterioration behavior of the waveform of the optical device itself or the waveform caused by the optical device such as the optical fiber.

So far, the deterioration behavior of the waveform of the optical device itself or the waveform, which are caused by the optical device such as the optical fiber, cannot be precisely evaluated in a state, where a data communication is operated.

SUMMARY OF THE INVENTION

The object of the present invention is to provide the optical pulse evaluation device capable of the characteristics evaluation such as the evaluation of the optical pulse itself or the evaluation of the change of the spectral intensity and spectral phase induced by optical devices or samples in which the optical pulse propagates, i.e. the spectral response of optical devices, and an in-service optical pulse evaluation device for measuring the wave length dispersion in the optical communication operated at relatively high bit-rate.

According to the present invention, the optical pulse evaluation device comprises (a) an optical pulse outputting means for outputting an optical pulse to be evaluated, (b) a optical frequency component extracting means for extracting a specific optical frequency component of the optical pulse output from this optical pulse outputting means, (c) a frequency component intensity measurement means for measuring intensity of the specific optical frequency component of the optical pulse extracted by this optical frequency component extracting means, and (d) a phase intensity operating means for operating the spectral phase and the spectral intensity of the optical pulse output from the optical pulse output means on the basis of a measurement result by this frequency component intensity measurement means.

According to the present invention, the specific optical frequency component of the optical pulse output from the optical pulse outputting means is extracted by the optical frequency component extracting means and the spectral phase and the spectral intensity of the optical pulse are operated by using an extracted frequency and the intensity of the frequency component of the optical pulse, which are the measurement results by the frequency component intensity measurement means.

Further according to the present invention, the optical pulse evaluation device comprises (a) the optical pulse outputting means for outputting an optical pulse to be evaluated, (b) an optical dividing means for dividing the optical pulse output from this optical pulse outputting means, (c) the optical frequency component extracting means for extracting the specific optical frequency component by receiving the one of optical pulses divided by this optical dividing means, (d) the frequency component intensity measurement means for measuring intensity of the specific optical frequency component of the optical pulse extracted by this optical frequency component extracting means, (e) a whole optical intensity measurement means for measuring the intensity of a whole optical pulse of the other divided by the optical dividing means, and (f) the phase intensity operating means for operating the spectral phase and the spectral intensity of the optical pulse output from the optical pulse output means on the basis of the measurement result of the frequency component intensity measurement means and the whole optical intensity measurement means.

According to the present invention, the optical pulse output from the optical pulse outputting means is divided by the optical dividing means and the divided one is used for operating the spectral phase and the spectral intensity of the optical pulse in the same way as that of the invention described in claim 1. According to the present invention, the other optical pulse output the optical dividing means is also used for the operation and, thus, using this as a reference signal allows canceling out a drift of a pulse position and the drift of the frequency, when these occur.

Further according to the present invention, an in-service optical pulse evaluation device comprises (a) an optical modulation unit for modulating a light ray, which is emitted from a light source, by using a digital data signal synchronized with a predetermined clock, (b) an optical divider for dividing an optical pulse train, which is obtained by modulation of this optical modulation unit, in a first and a second paths by using a transmission line, (c) a band pass filter for inputting the optical pulse train obtained by modulation of this optical modulation unit located in the first path, (d) a sweeping unit for sweeping a center frequency of this band pass filter, (e) a first photoelectric conversion element for receiving the light with the wavelength component passed through the band pass filter, (f) a first clock extraction module for inputting the electric signal converted by this first photoelectric conversion element to extract a dock signal synchronized with the digital data transmitted, (g) a second photoelectric conversion element for receiving the optical pulse train transmitted through the second path, (h) a second clock extraction module for inputting the electric signal converted by this second photoelectric conversion element to extract the clock signal synchronized with the digital data transmitted, (i) a phase detection means for detecting the phase of the clock signal output by the first and the second clock extraction modules to calculate time delayed by the band pass filter, and (j) an operation means for measuring the measurement result by the phase detection means during sweeping the center frequency of the band pass filter by the sweeping unit to operate chirping of the optical pulse or a dispersion of the transmission line.

According to the present invention, the light ray is modulated by using the digital data signal synchronized with the predetermined clock to make transmission through the transmission line divided in 2 paths. In the first path of these 2 paths, the light with the wavelength component passed through the band pass filter is converted to the electric signal by the first photoelectric conversion element to extract the clock signal synchronized with the transmitted digital data by the first clock extraction module. In the second path, the clock signal synchronized with the transmitted digital data is extracted by the second clock extraction module without passing through the band pass filter. The phase detection means detects the phase of the clock signal output by the first and the second clock extraction modules to calculate time delayed by the band pass filter. Finally, when the sweeping unit sweeps the center frequency of the band pass filter, the result of detection by the phase detection means is measured for operation of chirping of the optical pulse or the dispersion of the transmission line by the operation means.

Further, according to the present invention, the in-service optical pulse evaluation device comprises (a) the optical modulation unit for modulating the light ray, which is emitted from the light source, by using the digital data signal synchronized with the predetermined clock, (b) a signal sending unit for sending the optical pulse train, which is obtained by modulation of the optical modulation unit, to the transmission line, (c) the band pass filter for inputting the optical pulse train sent through the transmission line from this signal sending unit, (d) the sweeping unit for sweeping the center frequency of this band pass filter by using a predetermined sweep frequency, (e) the photoelectric conversion element for receiving the light with the wavelength component passed through the band pass filter, (f) the clock extraction module for inputting the electric signal converted by this photoelectric conversion element to extract the clock signal synchronized with the transmitted digital data, (g) a feedback voltage signal outputting unit for outputting a feedback voltage signal of a voltage in proportion to a time differential of a phase variation component of this clock signal by inputting the clock signal extracted by this clock extraction module, and (h) the operation means for measuring a component of the sweep frequency in the feedback voltage signal output by this feedback voltage signal outputting unit to operate chirping of the optical pulse or the dispersion of the transmission line.

According to the present invention, the optical pulse train generated by modulation of the light ray by the digital data signal synchronized with the predetermined clock is sent to the transmission line and, in a receiving end, the received optical pulse train is passed through the band pass filter, in which the center frequency is swept at the sweep frequency, and is converted to the electric signal with the photoelectric conversion element. The original clock signal is extracted from this electric signal and feedback voltage signal outputting unit outputs the feedback voltage signal of the voltage in proportion to the time differential of the phase variation component of the clock signal. Through measuring the component of the sweep frequency in this feedback voltage signal, operation is carried out for chirping of the optical pulse or the dispersion of the transmission line.

Further according to the present invention, the in-service optical pulse evaluation device comprises (a) the optical modulation unit for modulating the light ray, which is emitted from the light source, by using the digital data signal synchronized with the predetermined clock, (b) a transmission unit for sending the optical pulse train, which is obtained by modulation of the optical modulation unit, to the transmission line having a predetermined dispersion value, (c) a tunable dispersion compensator for adjusting a specified dispersion value by inputting the optical pulse train through the band pass filter for inputting the optical pulse train sent through the transmission line, and (d) a receiver for receiving the optical pulse train sent through the tunable dispersion compensator and monitoring the dispersion value to feedback the result as the specified dispersion value of the tunable dispersion compensator.

According to the present invention, the optical pulse train generated by modulation of the light ray by the digital data signal synchronized with the predetermined clock is sent to the transmission line and, in a receiving end, the dispersion value is monitored to send to the tunable dispersion compensator for feedback control thereof in order to adjust the specified dispersion value. As described above, according to the present invention, the spectrum of the optical pulse can be measured in the region having the relatively high bit-rate without deterioration of the signal and, hence, deterioration of the waveform can be analyzed in detail when the optical pulse is passed through the sample. Consequently, when the optical fiber system is built up, for example, measuring and evaluating highly precisely deterioration of the signal caused by light propagation to compensate the dispersion allows a light propagation distance to increase and an occurrence of a signal error to reduce. In addition, according to the present invention, when a repetition frequency becomes higher and the pulse width becomes narrower, the optical spectrum becomes relatively wider and, thus, as a rule, the characteristics evaluation of the optical pulse can be advantageously carried out in the relatively high bit-rate, which is difficult to allow analyzing the optical pulse.

On the other hand, according to the present invention, in the state where the data communication is actually working, the characteristics evaluation of the optical pulse can be carried out in the relatively high bit-rate and, therefore, it is unnecessary to stop temporarily a data transmission service for the characteristics evaluation.

DETAILED DESCRIPTION OF THE PREFERRED EMBODIMENTS

Example 1

Figure 1:
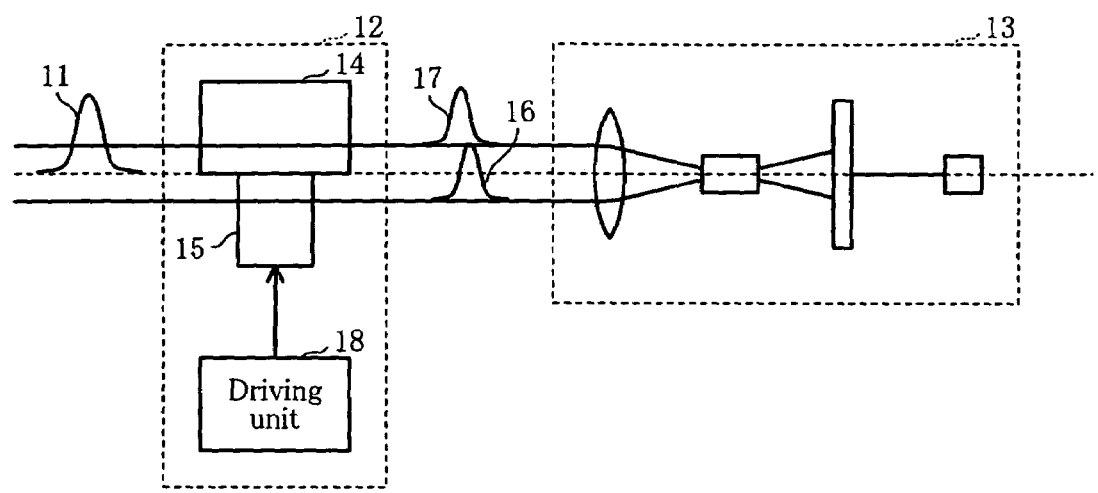
FIG. 1 is a schematic block diagram showing a constitution of an in-service optical pulse evaluation device according to the third proposal.
Figure 2:
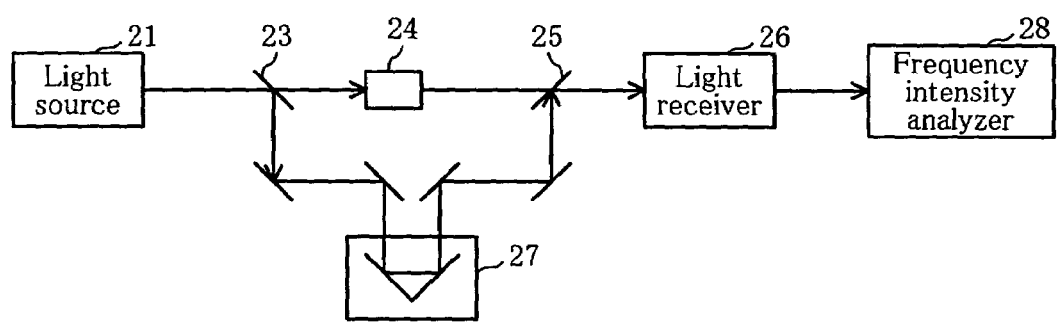
FIG. 2 is the schematic block diagram showing the constitution of the in-service optical pulse evaluation device according to the fourth proposal.
Figure 3:
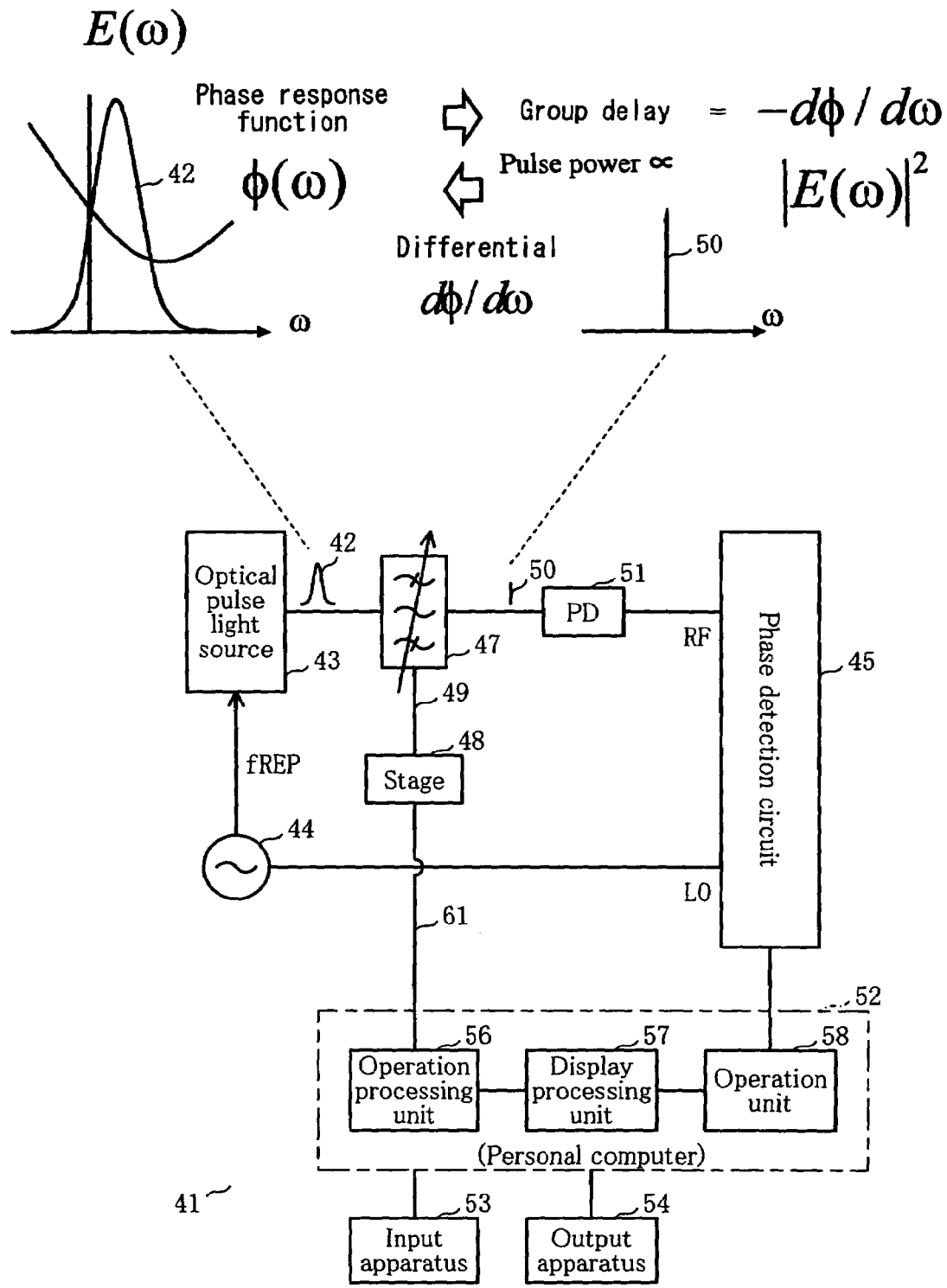
FIG. 3 is the schematic block diagram showing the constitution of an optical pulse evaluation device of the first example according to the present invention.

FIG. 3 shows a constitution of an optical pulse evaluation device of the first example according to the present invention. Optical pulse evaluation device 41 has optical pulse light source 43 outputs repeatedly optical pulse 42, which is evaluated in the present example, at a predetermined repetition frequency fREP. The repetition frequency fREP of optical pulse 42 is indicated on optical pulse light source 43 by repetition frequency defining means 44. A defined repetition frequency fREP is also input in phase detection circuit 45.

In this way, the optical pulse 42 expressed by the complex notation |E(ω)| and the phase φ(ω) output from optical pulse light source 43 at the defined repetition frequency fREP is input in tunable wavelength optical band pass filter 47. Where, "ω" represents an angular frequency. Tunable wavelength optical band pass filter 47 inputs tunable wavelength-directing signal 49 for changing the wavelength, which is passed through, from stage 48. By this step, the wavelength component 50 of a wavelength region defined for optical pulse 42 is only passed. The wavelength component 50 passed through tunable wavelength optical band pass filter 47 is emitted to photo diode (PD) 51. If it is assumed that optical pulse 42 is output from optical pulse light source 43 at relatively high repetition frequency fREP such as some giga to some ten giga bits/second, a velocity of changing the passed wavelength of tunable wavelength optical band pass filter 47 by stage 48 using tunable wavelength-directing signal 49 is the velocity relatively slow exemplified by 0.22 nm/s (nanometer/second.) This is because a plurality of optical pulses 42 output repeatedly from optical pulse light source 43 is measured for the identical passed wavelength to calculate an average value thereof to keep reliability of the measurement for each wavelength.

The output of photo diode 51 is input in phase detection circuit 45. Phase detection circuit 45 according to the present example is constituted by a lock-in amplifier and operates frequency conversion of a measured signal to a direct current by using a heterodyne detection technology. According to the present example, repetition frequency fREP output from repetition frequency defining means 44 is input as a lock-in signal (LO) and the output of photo diode 51 is input as a reference signal (RF.) The lock-in amplifier operates heterodyne detection of a lock-in signal as a local signal to detect the phase. In this step, positional information as a sine (sin) component of the wavelength component passed through tunable wavelength optical band pass filter 47 and amplitude information as a cosine (cos) component are known.

Such the detection result of phase detection circuit 45 is input in personal computer 52. Personal computer 52 has a CPU (central processing unit) not illustrated and a memory medium, in which a control program for working optical pulse evaluation device 41 is stored, not illustrated. On the other hand, such input apparatus 53 as a keyboard and a mouse and such output apparatus 54 as a liquid crystal display or a printer are connected to personal computer 52. Personal computer 52 has operation processing unit 56 for operating a processing for inputting a variety of operation information to realize optical pulse evaluation device 41 by executing the stored control program from input apparatus 53, display processing unit 57 for operating the processing for displaying the yielded result on output apparatus 54, and operation unit 58 for realizing a predetermined operation such as an inverse Fourier transform by software processing.

Operation processing unit 56 outputs direction signal 61 for varying the wavelength for stage 48. Operation unit 58 subjects the signal obtained from phase detection circuit 45 to the inverse Fourier transform and calculates the amplitude for each phase of optical pulse 42 to feed to the display processing unit 57. Display processing unit 57 displays the waveform of optical pulse 42 output from optical pulse light source 43 according to a displayed content directed by operation processing unit 56.

Figure 4:
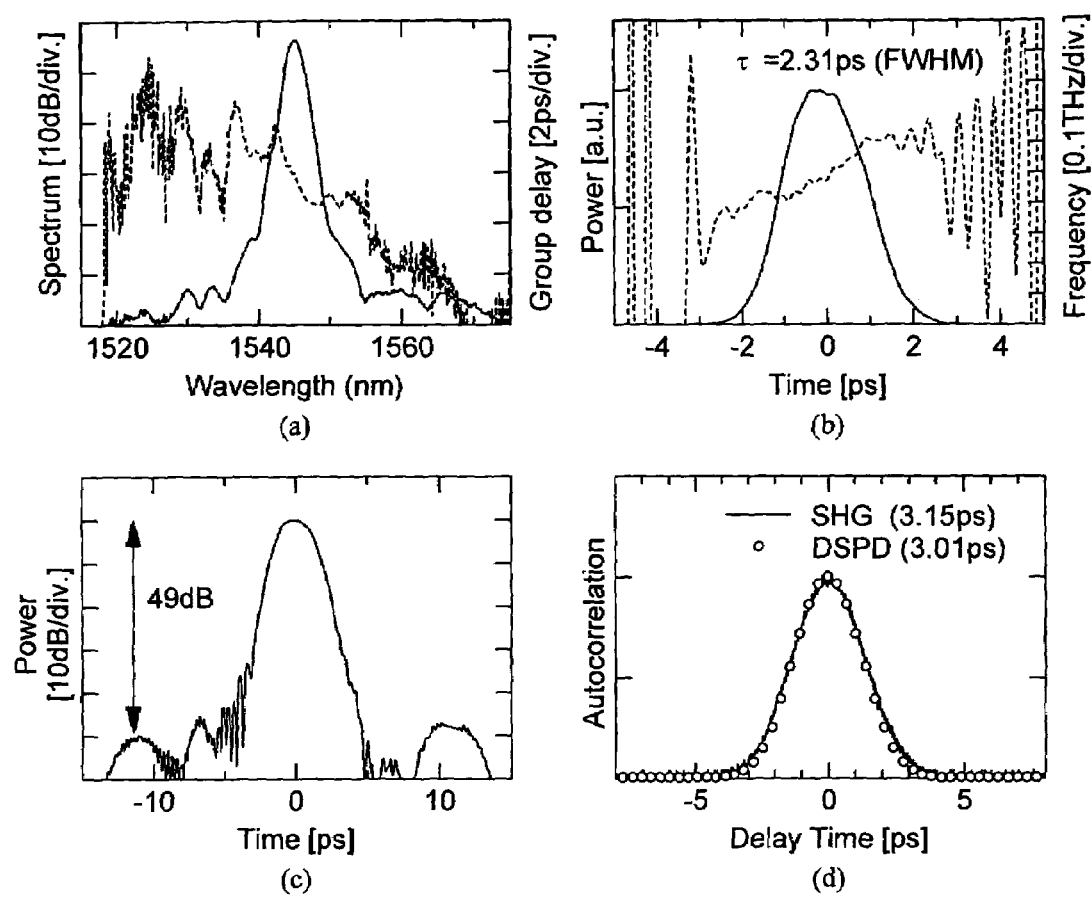
FIG. 4, consisting of FIGS. 4(a) to 4(d), is a characteristic view showing a result of measurement of the optical pulse in the first example.

FIG. 4 shows the result of measurement of the optical pulse. In this example, optical pulse light source 43 shown in FIG. 3 uses a mode-locked laser diode and shows an optical pulse characteristic in the case where optical pulse 42 is output at the repetition frequency fREP of 10 gigabits/second. Diffraction grating-type band pass filter of 0.6 nm is used as tunable wavelength optical band pass filter 47. This tunable wavelength optical band pass filter 47 can vary the wavelength from 1520 nm to 1600 nm and can change the center frequency by changing its incident angle. As phase detection circuit 45, a lock-in amplifier detector is used. The output signal is fed into personal computer 52, and finally, auto correlation can be obtained for the electric field of the optical spectrum by operation processing.

The solid line in FIG. 4(a) represents the signal spectrum of the measured optical pulse and the broken line represents group delay ($-d\phi/d\omega$) characteristic depending on the wavelength. The solid line in FIG. 4(b) represents waveform of the intensity of the optical pulse on a time base and the broken line represents the optical frequency component. The optical pulse contains various light wavelengths. In the figure, the left and right ends of the waveform of the optical pulse shows the presence of the light having short and long wavelengths as the measurement result. A pulse width ($\tau$) is 2.31 ps in FWHM (Full Width Half Maximum.) Fig. (c) shows the waveform expressing the power of the optical pulse on the time base and the axis of ordinate shows dB indication. In comparison with the conventional example, remarkably high accuracy evaluation of the optical pulse waveform is realized to enable to make indication logarithmically. It can be known that a dynamic range exceeds 49 dB. As such, a peak with a small waveform, which, in the past, cannot be observed because it is lost in the noise, can be satisfactorily detected in the first example. On the other hand, a fine form of the pulse waveform can be specified.

The solid line in FIG. 4(d) represents an auto correlation waveform produced by using SHG (Second Harmonic Generation) light, which is one of conventional evaluation methods. In contrast to this, the circle represents the auto correlation waveform produced by calculation of the intensity waveform of the figure (c) of the present example. Hence, it can be known that the present example shows an auto correlation trace and the pulse width, which are similar to the conventional evaluation methods. By this, reliability of an evaluated value itself using the present example is confirmed.

First Modification Example of the First Example

Figure 5:
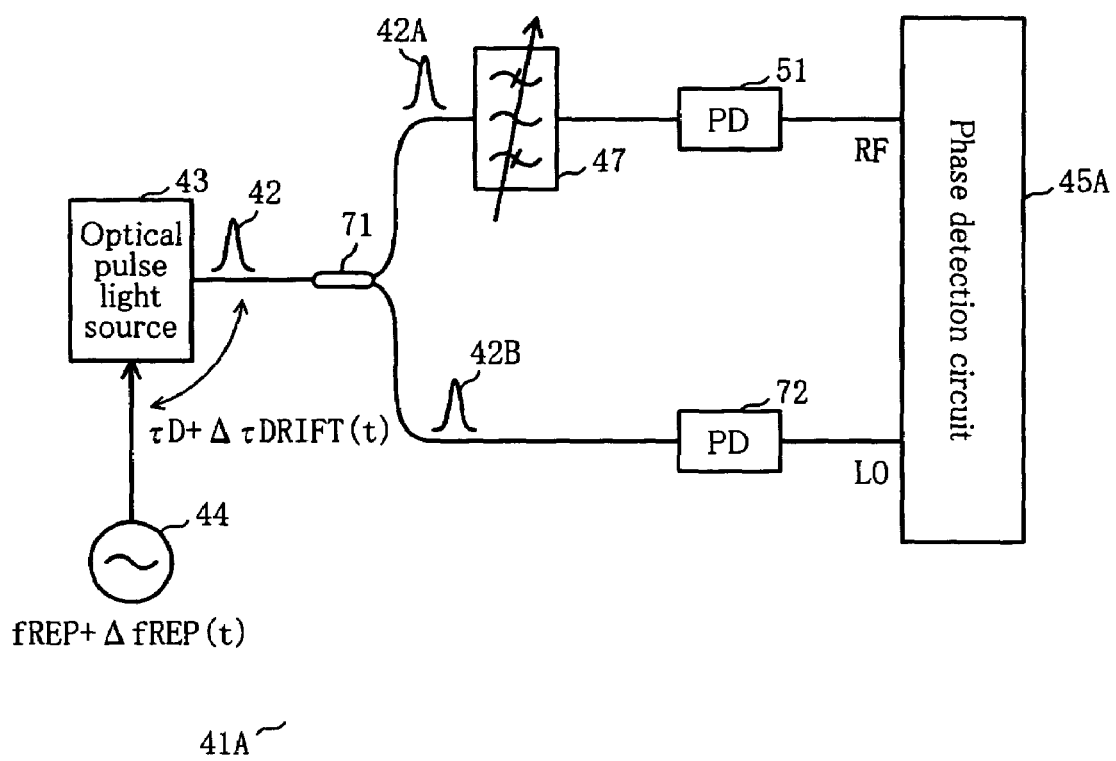
FIG. 5 is a block diagram of a main part of the constitution of an optical pulse evaluation device of a first modification example of the first example according to the present invention.

FIG. 5 shows the main part of the optical pulse evaluation device in the first modification example of the first example according to the present invention. In FIG. 5, a same reference numeral is attached to the part identical with that of FIG. 3 and, thus, description of the part is omitted properly. In the optical pulse evaluation device 41A of this modified example, optical pulse 42 output from optical pulse light source 43 is divided in 2 parts by optical divider 71. Optical pulse 42A propagating in the line branched upward in the figure is input in tunable wavelength optical band pass filter 47 having a 0.6 nm full width half maximum. Similar to the previous example, the light of the wavelength component passed through this filter is received by photodiode 51, and its output is input as the reference signal (RF) of phase detection circuit 45A. Optical pulse 42B propagating in the line branched downward in the figure is received by the other photodiode 72 having the equal characteristic to that of photodiode 51 without any limitation of a passband, and its outputs is input in phase detection circuit 45A as the lock-in signal (LO.) A section of the circuit other than this is identical to that of the previous example and, thus, illustration of the part is omitted.

In optical pulse evaluation device 41A of this first modified example, optical pulse 42B obtained by branching of optical pulse 42 output actually from optical pulse light source 43 is subjected to photoelectric conversion for inputting phase detection circuit 45A. Therefore, different from optical pulse evaluation device 41 of the previous example, in the case where the position of the optical pulse output from optical pulse light source 43 is varied by vibration of a component such as a mirror of an optical system not illustrated and a frequency drifts finely, the phase detection circuit works with a drifted value as a reference. As the result, the effect of the drift is canceled to allow carrying out the evaluation of the optical pulse.

Figure 6:
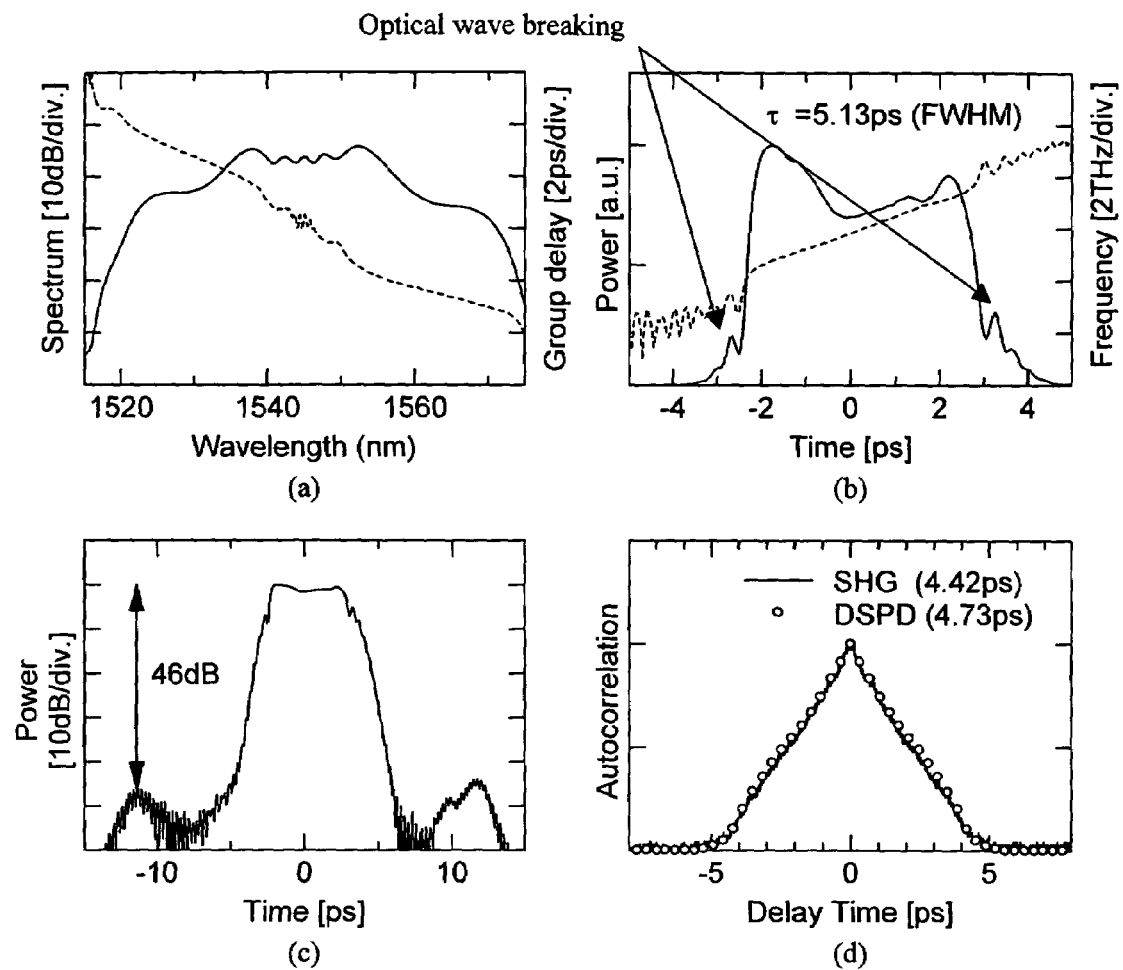
FIG. 6, consisting of FIGS. 6(a) to 6(d), is the characteristic view of the optical pulse from a wide bandwidth light source in the first modification example.

FIG. 6 shows the result of the evaluation of the optical pulse by using a super continuum light spreading to the wide bandwidth using the optical pulse evaluation device of the first modification example. The figure (a) represents the signal spectrum of the measured optical pulse and the broken line represents group delay characteristic as a function of the wavelength. The solid line in FIG. 4(b) represents the waveform of the intensity of the optical pulse as a function of time and the broken line represents the optical frequency component. Figure (c,) shows the waveform of the optical pulse on the time base, and the axis of ordinate shows dB indication. Also in this case, as described in FIG. 4, in comparison with the conventional example, remarkably high accuracy evaluation of the optical pulse waveform is realized. It can be known that the dynamic range exceeds 46 dB. By this, the peak with the small waveform, which, in the past, could not be observed because it was lost in the noise, can now be detected. This is called an optical wave-breaking phenomenon caused by the auto phase modulation being one of the nonlinear effect. Using optical pulse evaluation device 41A capable of the high accuracy measurement enables this observation. In addition to this, the evaluation of a transmittance characteristic of a saturable absorber becomes possible.

The solid line in figure (d) shows the auto correlation waveform produced by using SHG (Second Harmonic Generation) light, which is one of the conventional evaluation methods. The circle represents the auto correlation waveform produced by calculation of the intensity waveform of the figure (c) of the present example. Hence, it has been known that the present modified example shows also the auto correlation trace and the pulse width, which are similar to the conventional evaluation methods. By this, the reliability of the evaluated value itself is confirmed. On the other hand, the waveform presented in this figure (d) differs from the actual waveform of the optical pulse to be evaluated. This point is same as that for the figure (d.)<

Second Modification Example of the First Example

In the second modification example of the first example according to the present invention, it is same as that of the first modified example that optical pulse evaluation device 41 shown in FIG. 3 is used. However, the control program to be installed in personal computer 52 differs slightly from the previous example in the point that the optical intensity waveform and the instantaneous frequency can be obtained by reconstructing the measurement result of the optical pulse.

In the second modification example, a filter characteristic of tunable wavelength optical band pass filter 47 shown in FIG. 3 is assigned to Lorenz type (Cauchy distribution), which is a common filter characteristics as seen in conventional dielectric multilayer band pass filters, and the filter bandwidth is defined as 0.6 nm. On the other hand, optical pulse 42 output from optical pulse light source 43 is assigned to the pulse having a Gaussian waveform having 1 picosecond full width half maximum and the repetition frequency fREP of 10 gigabits/s. In addition, in the second modification example, what the spectrum intensity and the spectrum phase are calculated from the amplitude and the phase of a photoelectrically converted photocurrent output from photodiode 51 is same as that of the example. Such information is reconstructed by personal computer 52 to know the optical intensity waveform and the instantaneous frequency.

Figure 7:
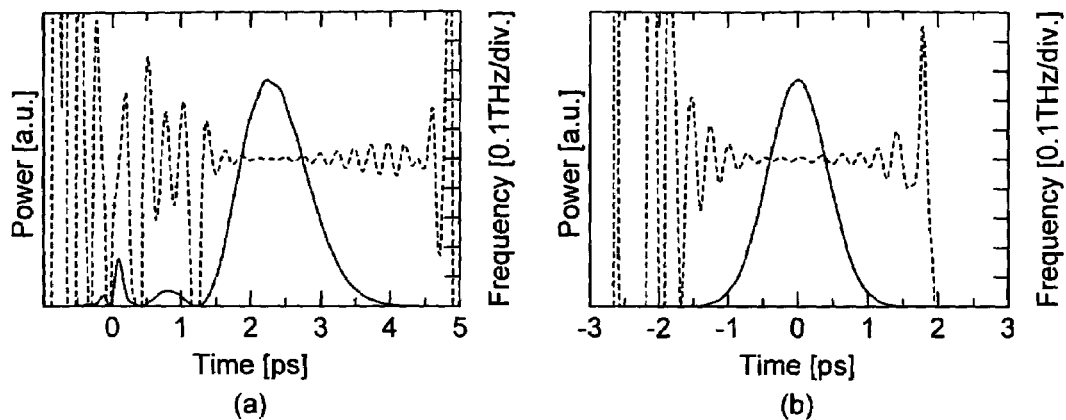
FIG. 7 is a figure showing a result of a simulation in a second modification example of the first example according to the present invention.

FIG. 7 shows the result of the simulation in the second modification example according to the present invention. Figure (a) shows the waveform and the instantaneous frequency as a change of the frequency chirp in the case where the filter characteristics are not compensated for. Where, the "chirp" is the proportion of the change of the instantaneous frequency and also named a frequency chirp or chirping. In the figure (a,) a distortion of the pulse waveform is caused by the dispersion of the filter. In contrast to this, in the figure (b,) an arithmetic operation is executed for compensating the filter characteristics to eliminate the distortion of the pulse waveform and the instantaneous frequency.

Figure 8:
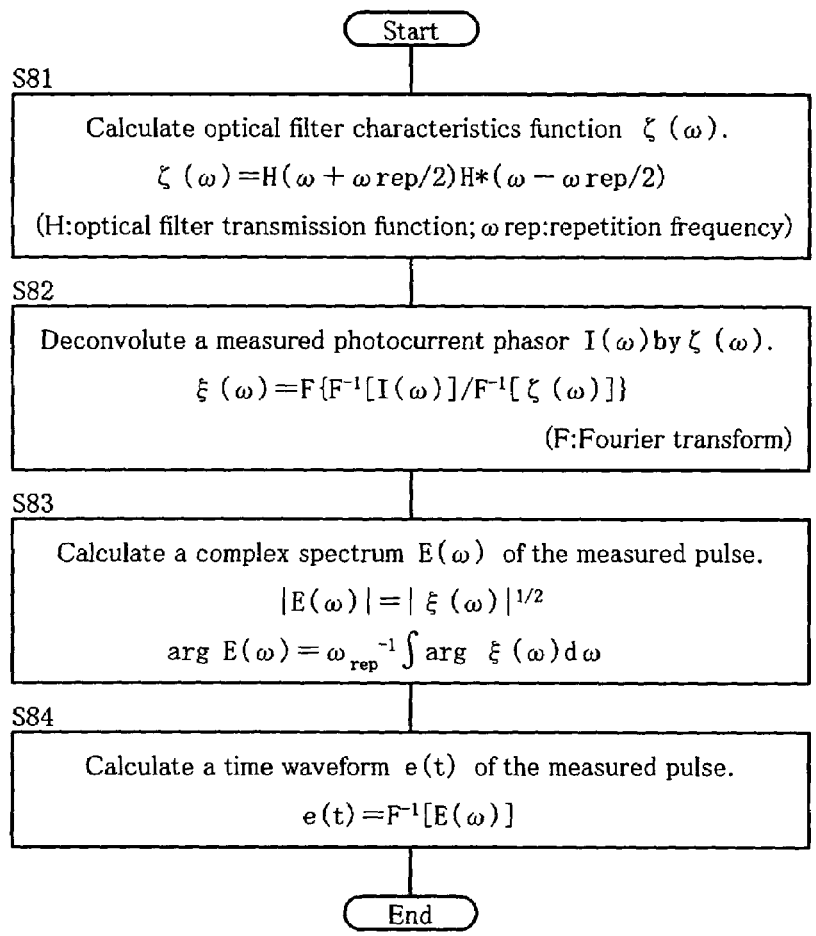
FIG. 8 is a flow chart of an operation processing for compensation of a filter characteristic in the second modification example of the first example according to the present invention.

FIG. 8 shows the flow of the operation processing for compensating the filter characteristics in this second modification example. Where, when an optical filter characteristics function $\zeta(\omega)$ is calculated by using personal computer 52 shown in FIG. 3 (step S81,) a delay part of tunable wavelength optical band pass filter 47 for optical pulse 42 has been included into the transfer function of the optical filter H. And, a measured photocurrent phasor I($\omega$) is deconvoluted with optical filter characteristics function $\zeta(\omega)$ (step S28) to know the complex notation E($\omega$) of the measured pulse (step S83) and to know a time wavelength e(t) of the measured pulse (step S84.)

Third Modification Example of the First Example

In the first example and the modified example as described above, characteristics of the optical pulse itself output from the optical pulse light source were evaluated. A, known optical pulse can be used for measuring and evaluating a variety of optical devices.

Figure 9:
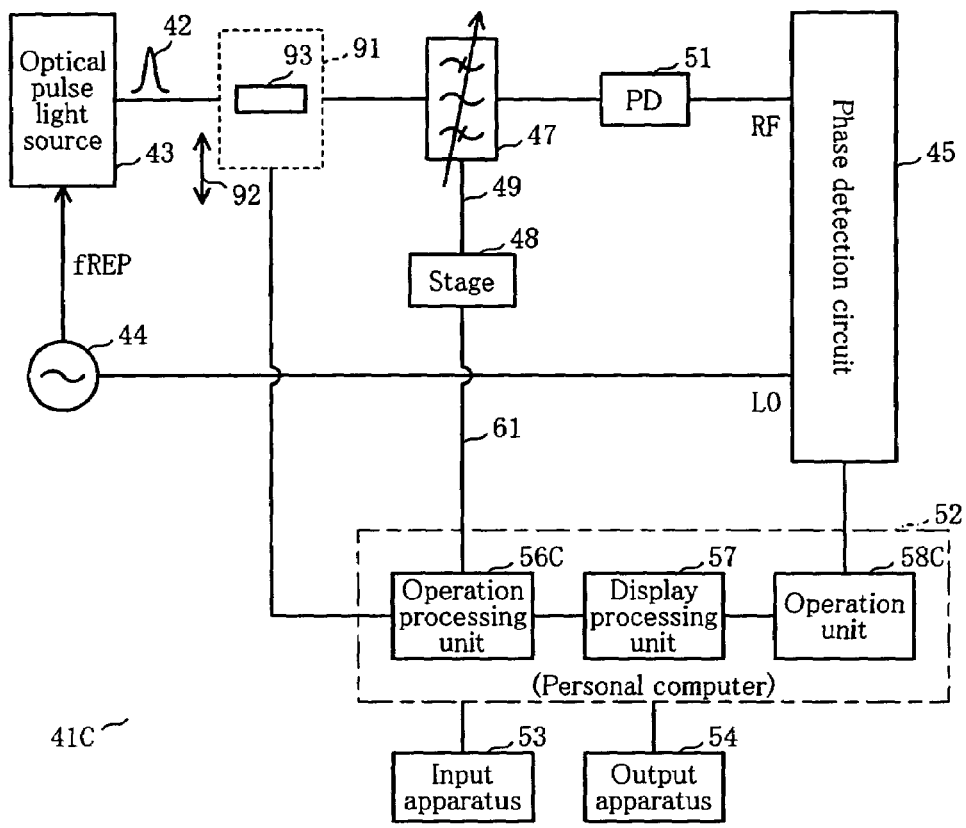
FIG. 9 is the schematic block diagram showing the optical pulse evaluation device used for sample evaluation in a third modification example of the first example according to the present invention.

FIG. 9 shows the outline of the constitution of the optical pulse evaluation device for evaluating the sample, as the third modification example of the first example according to the present invention. In FIG. 9, the same reference numeral is attached to the part identical with that of FIG. 3 and, thus, description of the part is omitted property. In optical pulse evaluation device 41C of this modification example, a movable sample stage 91 is located between optical pulse light source 43 and tunable wavelength optical band pass filter 47 of optical pulse evaluation device 41, which are shown in FIG. 3. Sample stage 91 can be moved in arrow 92 crossing the light path to make it attachable to and detachable from the light path. As illustrated, when sample stage 91 is located in the light path, the light passed through sample 93 mounted on sample stage 91 is launched to tunable wavelength optical band pass filter 47. On the other hand, in the state where sample stage 91 moves to a position out of the light path, optical pulse 42 output from optical pulse light source 43 is intactly launched to tunable wavelength optical band pass filter 47. In sample stage 91, a driving mechanism not illustrated controls the movement in arrow 92 direction by a direction of operation processing unit 56C in personal computer 52.

In optical pulse evaluation device 41C having such the constitution, in the state, for example, where sample 93 such as the optical fiber is not inserted in the light path between optical pulse light source 43 and tunable wavelength optical band pass filter 47, characteristics of optical pulse 42 itself are measured in the same way as that of FIG. 3. Next, operation processing unit 56C gives directions to sample stage 91 on putting sample 93 in the light path and, in the state, the same measurement is performed. Operation unit 58C knows characteristics of sample 93 itself to the optical pulse as the reference. The directions for characteristics to be known are issued to personal computer 52 by input apparatus 53. By this, the chirping, dispersion, and phase shift of a reference optical pulse are measured and a display result is output to output apparatus 54 by display processing unit 57.

The reference optical pulse is the optical pulse reproduced from an ideal optical pulse or the optical pulse generated under an environmental condition. Optical pulse 42 itself output from optical pulse light source 43 has an individuality and, thus, is not the ideal optical pulse or the optical pulse reproduced from a situation. Therefore, once the characteristics of optical pulse 42 output actually from optical pulse light source 43 in the state, where sample 92 is absent in the light path, is measured and, on the basis of this, the characteristics of the optical pulse after passed through sample 93 is corrected to enable to evaluate sample 93 under a variety of environmental conditions.

It has been described above that in optical pulse evaluation device 41C of the third modification example, sample stage 91 is automatically attached to and detached from the light path. However, it may be sufficient that an operator mounts manually sample stage 91 on the light path and unmounts it manually from the light path. On the other hand, it is not necessary that the optical pulse evaluation device for evaluating the sample uses optical pulse evaluation device 41 shown in FIG. 3 as a base, For example, optical pulse evaluation device 41A shown in FIG. 5 may be used.

In the first example and modification examples as described above, any special description is not given to elimination of errors caused by dispersion, or transmittance characteristic, or delay characteristic of tunable wavelength optical band pass filter 47. However, such errors can be eliminated by the arithmetic operation based on a known method already proposed. By this, not only the dielectric multilayer band pass filter preferable as tunable wavelength optical band pass filter 47 but also the optical band pass filter using the diffraction grating system and the tunable wavelength fiber Bragg grating system allows the known method to eliminate errors, which is caused by these factors, to measure highly precisely. For example, in the case where the dielectric multilayer is used as tunable wavelength optical band pass filter 47, it is attempted to pass actually the optical pulse to measure the delay time. Next, the value is stored in personal computer 52 as data for correction and, then, used for correction of errors.

In the first example, the pulse train generated in a predetermined repetition cycle is evaluated by using the optical pulse evaluation device. However, the object of the evaluation is not limited to this. The present invention can be applied to all the pulse light sources and be used for various things and matters such as mode locking and gain-switching.

Example 2

When as described above, the transmission velocity of the optical communication system becomes higher resulting in the communication in the bit rare over 40 Gbit/s, the distortion of the waveform, which is caused by the chromatic dispersion of an optical devise located in the optical fiber and the transmission line, becomes remarkable. The chromatic dispersion is a phenomenon, in which the propagation velocity (group velocity) of the light differs from each other in accordance with the wavelength. If the chromatic dispersion is not zero, a propagation delay time differs between individual spectrum components of the optical pulse and, hence, the time width of the optical pulse (hereafter pulse width) widens. In the optical communication system, a widened pulse width causes an inter-symbol interference to make an accurate information transmission impossible. An allowance of the chromatic dispersion is named a dispersion tolerance. In an actual optical communication system, a dispersion value should be administered to make a total dispersion fall in a dispersion tolerance range. Specifically, the dispersion value of the transmission line is measured and, by using a dispersion compensator such as a dispersion compensation fiber having the dispersion of a code reverse thereto, an accumulated dispersion should be compensated. Consequently, knowing the dispersion value of the transmission line is practically very important.

Knowing the phase or the instantaneous frequency of the optical pulse enables the knowing of the chirp of the optical pulse. On the basis of this, in the optical communication system, an amount of the dispersion received by the optical pulse and the amount of the dispersion to be compensated are determined. As clearly known from the first example and modification examples thereof as described above, the optical pulse arriving in a specific time interval makes knowing the phase or the instantaneous frequency of the optical pulse possible.

However, in the state of in-service where the optical communication system provides the service, a signal light is modulated by the digital data. Therefore, optical pulse evaluation device 41, which is shown in FIG. 3, based on the optical pulse regularly repeating in the specific time interval cannot be intactly used in the actual optical communication system.

Figure 10:
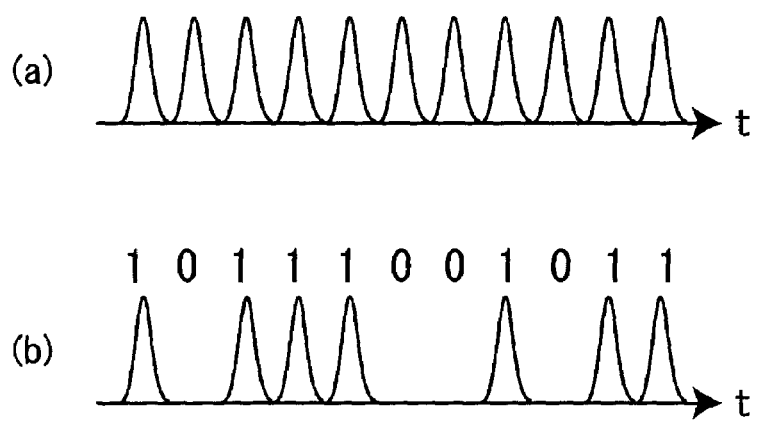
FIG. 10, consisting of FIGS. 10(a) to (b), is a waveform chart showing a waveform of a regularly arriving optical pulse and an intermittently arriving optical pulse.

FIG. 10 shows 2 optical pulse trains. In this figure, the axis of abscissa represents the time passed. Figure (a) shows the optical pulse train, which is output from optical pulse light source 43 shown in FIG. 3, arriving in the specific time interval. In contrast to this, figure (b,) shows the optical pulse train, which is converted by the digital data, and an example of an actual transmission signal light in the optical communication. As shown in figure (a,) in case of the optical pulse train arriving in the specific time interval, a photodetector such as the photodiode shown in FIG. 3 outputs the electric signal having the repetition frequency synchronized with the optical pulse train. Therefore, using a phase comparator for the repetition frequency component provides the delay time of the optical pulse.

Notwithstanding, as shown in FIG. 10(*b,*) in case of the signal light modulated by the digital data, a periodic regularity becomes absent in the pulse train due to the sent digital data to cause a lack of a pulse. Therefore, the phase comparator is not easily usable. The second example according to the present invention solves such the problem as follows. 1) The photoelectrically converted electric signal itself is not used, but the clock signal synchronized with the transmitted digital data is extracted for use. 2) For making the constitution simple, improvement is achieved as that the center frequency of optical band pass filter is swept at a specific repetition frequency and the chirp is obtained from a phase displacement of the clock signal.

Figure 11:
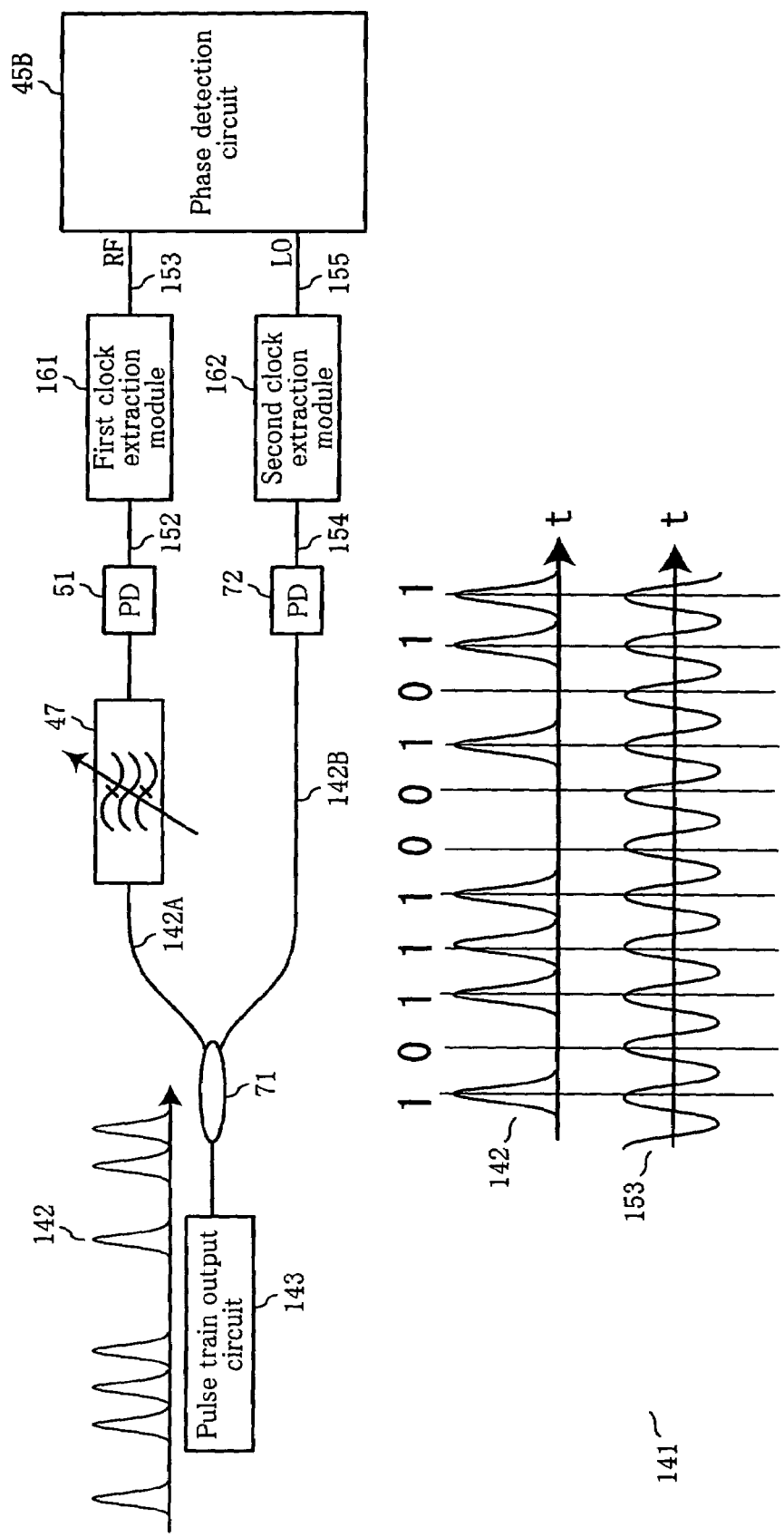
FIG. 11 is the schematic block diagram showing the main part of the in-service optical pulse evaluation device according to the second example according to the present invention.

FIG. 11 corresponds to FIG. 5 in the first modification example of the first example and shows the main part of the in-service optical pulse evaluation device according to the second example. In FIG. 11, the same reference numeral is attached to the part identical with that of FIG. 3 and FIG. 5 and, thus, description of the part is omitted properly.

In in-service optical pulse evaluation device 141 has pulse train outputting means 143 for outputting a pulse train 142 modulated by the digital data. Optical pulse light source 43 and repetition frequency defining means 44 shown in FIG. 5 are absent. It is assumed that the bit-rate for the pulse train 142 is assigned to B. Pulse train 142 is divided in 2 parts by optical divider 71. In the figure, the optical pulse train 142A propagated in the optical path branched upward in the figure, similar to the previous example, is input in tunable wavelength optical band pass filter 47 having 0.6 nm full width half maximum, the light of the wavelength component passed through this filter is received by photodiode 51, and electric signal 152 as its output is input in first clock extraction module 161. Reference signal 153 is input from first clock extraction module 161 to reference signal inputting terminal (RF) of phase detection circuit 45B.

Optical pulse train 142B propagating in the light path branched toward the bottom of the figure is received by the other photodiode 72 having the equal characteristic to that of photodiode 51 without any limitation of the passband. Its output 154 is input in second clock extraction module 162. The lock-in signal 155 is input from second clock extraction module 162 to a lock-in signal-inputting terminal (LO) of phase detection circuit 45B. The section of the circuit other than these is identical to that of the first example and, thus, illustration of the part is omitted.

For in-service optical pulse evaluation device 141, first, a synchronized clock of (1) will be described below. In in-service optical pulse evaluation device 141, the transmission signal light in the optical communication is assumed as a measured optical pulse. Optical pulse train 142 has various frequency components and, hence, as described above, a simple phase comparison is difficult. Therefore, first and second clock extraction module 161 and 162 extract each clock signal synchronized with the transmitted digital data (a sinusoidal wave of which the repetition frequency is B or the digital waveform of which repetition frequency is B.) This operation called clock extraction or clock recovery can arbitrarily use an existing method such as using a narrow bandwidth filter of which the central wavelength is the bit-rate B and using a phase lock loop circuit. The phase of clock signal is synchronized with the optical pulse train. Consequently, similarly to FIG. 4 of the first example, the delay time, which is caused by tunable wavelength optical band pass filter 47, can be known by phase comparison and sweeping the center frequency of tunable wavelength optical band pass filter 47 allows obtaining the chirping of the optical pulse. In other words, the clock signal synchronized with the digital data signal is extracted and a phase change of this clock signal is detected to know the spectral phase from the phase change of the clock signal, and the chirping of the optical pulse can be known from the change of the spectral phase when the center frequency of the band pass filter is swept.

In in-service optical pulse evaluation device 141, the optical pulse train (refer to FIG. 10(*b*)) obtained by modulating the intensity or the phase of the light by using the digital data signal is input in tunable wavelength optical band pass filter 47. Where, the digital data signal contains a pseudo random signal as an irregular signal repeated temporarily and spatially.

Example 3

Next, "(2) simplification of the constitution is intended by improving optical pulse evaluation device 41A" will be described below. The constitution of FIG. 11 is an improved constitution of FIG. 5. In this case, for making the reference of the phase, pulse train 142 was branched in 2 paths and clock extraction should be carried out for each of first and second clock extraction module 161 and 162. In the third example according to the present invention, in comparison with the second example, simplification of the constitution of in-service optical pulse evaluation device is intended.

Figure 12:
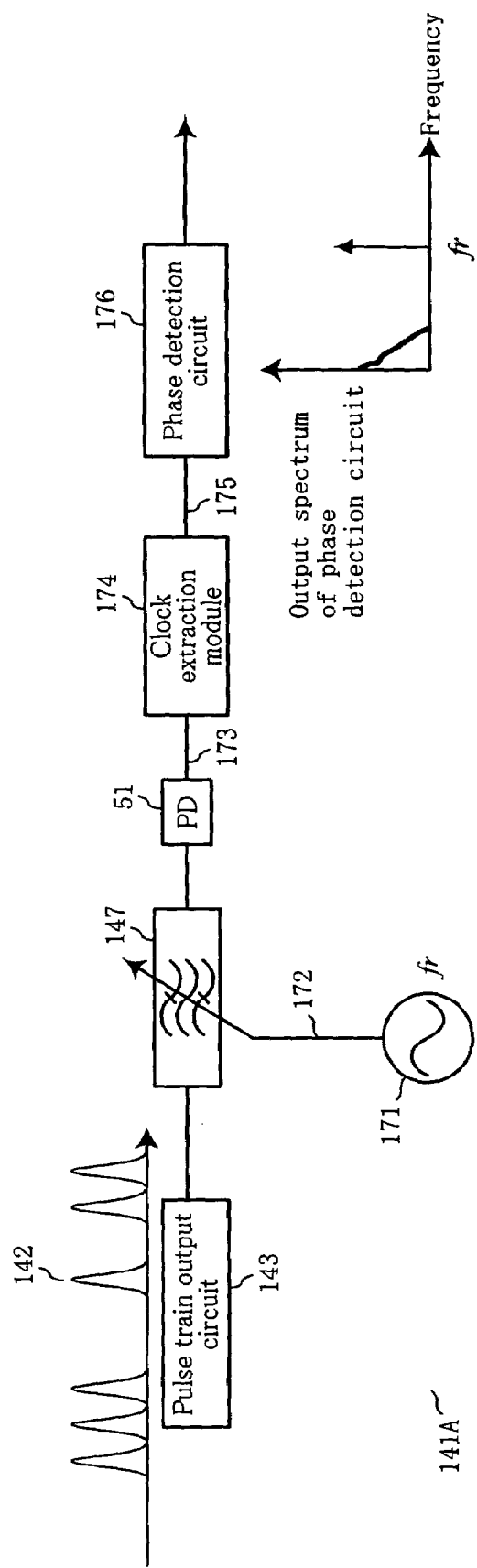
FIG. 12 is the schematic block diagram showing the in-service optical pulse evaluation device of the third example according to the present invention.

FIG. 12 shows the in-service optical pulse evaluation device of the third example. This in-service optical pulse evaluation device 141A inputs intactly pulse train 142, which is modulated by the digital data output from pulse train outputting means 143, in tunable wavelength optical band pass filter 147. To tunable wavelength optical band pass filter 147, sinusoidal wave 172 having a sweep width Δf and a sweep frequency fr is supplied from sinusoidal wave generating device 171 to operate periodical sweeping. Pulse train 173, which is output from tunable wavelength optical band pass filter 147 after sweeping, is input in clock extraction module 174 to operate extraction of clock signal 175. Extracted clock signal 175 is input in phase detection circuit 176 composed of PLL (Phase Locked Loop) circuit. The section of the circuit other than this is identical to that of the first example and, thus, illustration of the part is omitted.

Figure 13:
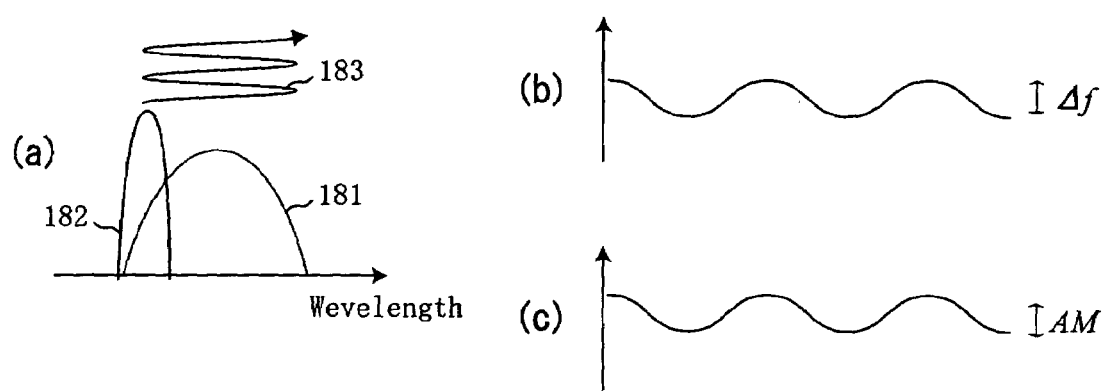
FIG. 13, consisting of FIGS. 13(a) to 13(c), is a view illustrating a sweeping behavior of a tunable wavelength optical band pass filter according to the third example.

FIG. 13(*a*) shows a sweeping behavior of the tunable wavelength optical band pass filter. Curve 181 expresses the optical spectrum to be measured or the spectrum of an arrived signal light. Curve 182 expresses the transmittance spectrum of the light transmitted through tunable wavelength optical band pass filter 147, which is shown in FIG. 12, to be input in photo diode 51. On the other hand, Curve 183 expresses the waveform of sinusoidal wave 172 with the sweep width Δf and the sweep frequency fr. FIG. 13(*b*) shows the change of the central system of tunable wavelength optical band pass filter 147. The figure (c) shows the change of the phase of clock signal 175 output from clock extraction module 174 in FIG. 12.

With reference to FIG. 12, an operation principle of in-service optical pulse evaluation device 141A of the third example will be described below. In accordance with the center frequency of tunable wavelength optical band pass filter 147, the phase of clock signal 175 changes. Therefore, the phase of clock signal 175 is also swept by using the sweep frequency fr as shown in FIG. 13(*c*.) The amplitude AM of this phase modulation component proportions to the chirp (i.e., remained dispersion) of the measured light pulse. Thus, it is sufficient to know this amplitude AM.

The difference from FIG. 11 of the second example will be described below. In FIG. 11, a direct current component of the clock signal is detected and, on the contrary, in the third example, an alternate current (frequency fr) component is detected. Therefore, in the third example, the reference phase is unnecessary and a phase detector (for example PPL circuit) providing a high sensitivity to the phase displacement can be used. On the other hand, as a practical advantage, it is possible to tolerate a large noise located in low frequency region. In the third example, it is not possible to determine a direction (sign of dispersion) of the chirp from only the amplitude of the phase of dock signal 175. However, the decision is possible by using a phase relation with the waveform of sinusoidal wave 172 sweeping tunable wavelength optical band pass filter 147.

First Experimental Example

For in-service optical pulse evaluation device 141A shown in FIG. 12, measurement capability of the chirp and the dispersion of the optical pulse is actually examined by using the optical communication system. Here, in consideration of a practical usage, the chirp of the optical pulse was not measured, but the dispersion value received by the optical pulse was measured. If the optical pulse to be input is chirp-free (the state of absence of chirp,) the chirp and the dispersion of the optical pulse after transmission are equal to each other.

Figure 14:
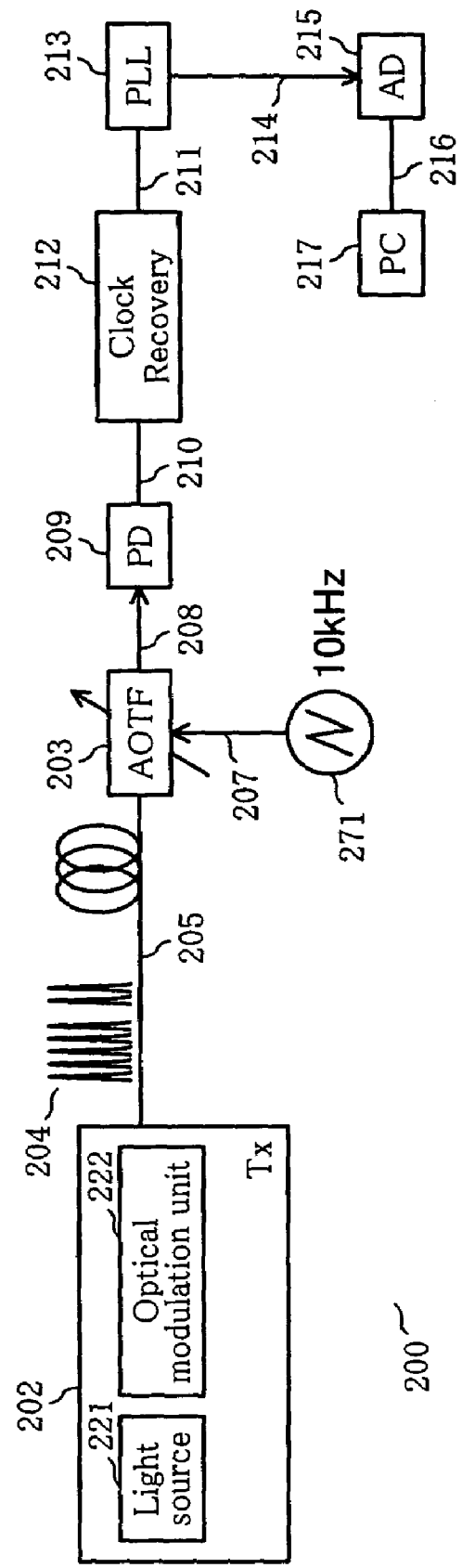
FIG. 14 is a system block diagram of a communication system of the first experimental example.

FIG. 14 shows the communication system of the first experimental example, which is an embodiment of the in-service optical pulse evaluation device of the third example. Communication system 200 of the first experimental example has optical pulse transmitter (Tx) 202 for outputting the pulse train modulated by the digital data. Optical pulse transmitter (Tx) 202 has light source 221 and optical modulator 222 for modulating the light output from this light source 221 by the digital data signal synchronized with the predetermined clock. Between optical pulse transmitter 202 and acousto-optic tunable filter (AOTF) 203 constituting the tunable wavelength optical band pass filter, optical fiber 205 is connected to send the signal light (pulse train) 204 after modulation by optical modulator 222. To Acousto-Optic Tunable Filter 203, sinusoidal wave generating device 271 is connected to supply sinusoidal wave 207, of which sweep frequency fr becomes 10 kHz. The signal light 208 output from acousto-optic tunable filter 203 after sweeping is input in photodiode 209 to be converted to the electric signal. Electric signal 210 output by photodiode 209 is input in clock extraction module 212 for extracting and outputting clock signal 211. Extracted clock signal 211 is input in PLL circuit 213 and PLL output signal 214 is input in AD converter 215. AD converter 215 sends digital data 216 after conversion to personal computer (PC) 217.

In such communication system 200 of the first experimental example, a transmission conditions for sending the digital data by optical pulse transmitter 202 are 40 Gbits/s for the bit-rate B and 1549.65 nm for the wavelength of the signal light. For a transmission format, RZ (return-to-zero) system is applied. Acousto-optic tunable filter 203 changes the central wavelength in a very high speed in tunable wavelength optical band pass filter 147 (FIG. 12) (T. N. Akazawa et al., Technical Digest of Optical Fiber Communication '98, paper PD1, 1998.) The bandwidth of acousto-optic tunable filter 203 of the present example is 0.55 nm (70 GHz.) The sweep frequency fr is 10 kHz and the sweep width $\Delta f$ of acousto-optic tunable filter 203 is 20 GHz. The light output from acousto-optic tunable filter 203 is subjected to photoelectric conversion by photodiode 209 and, then, extracts clock signal 211 of 40 GHz by clock extraction module 212. PLL output signal 214 output from PLL circuit 213 is the clock signal expressing the magnitude of the feedback voltage and proportions to time differential of the phase variation component of the clock signal 211. Digital data 216 output from AD converter 215 is fed to personal computer to measure the magnitude of the component of which frequency fr is 10 kHz.

Figure 15:
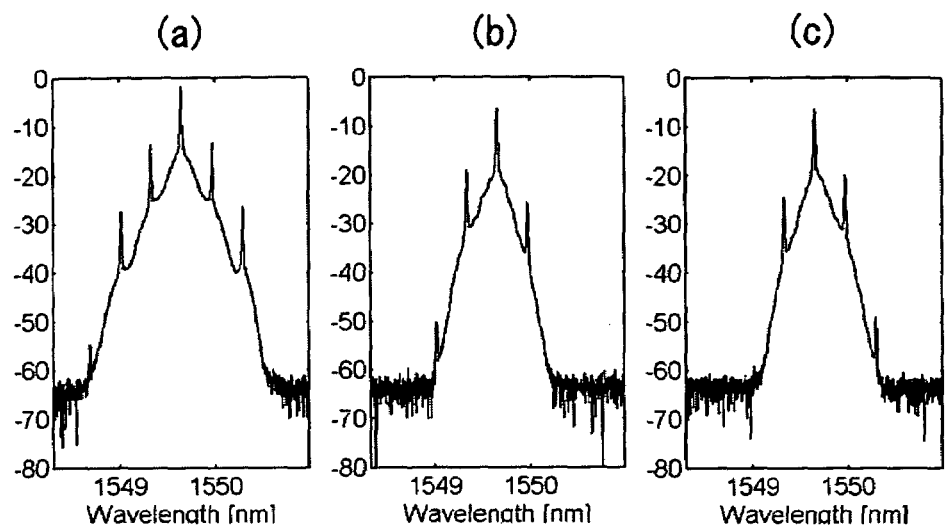
FIG. 15, consisting of FIGS. 15(a) to 15(c), is the waveform chart showing a signal spectrum of each unit of the communication system according to the first experimental example shown in FIG. 14.

FIG. 15 is the signal spectrum of each unit of the communication system according to the first experimental example shown in FIG. 14. Figure (a) shows the spectrum of signal light 204 before it is filtered out by acousto-optic tunable filter 203 shown in FIG. 14. Figures (b) and (c) show spectrum changes of signal light 208 passed through acousto-optic tunable filter 203. These changes correspond to the sweep width $\Delta f$ of sinusoidal wave 172 (FIG. 12) expressed by curve 183 of FIG. 13. Deviations of the optical frequency of the signal light 208 from the center frequency of acousto-optic tunable filter 203 as the tunable wavelength optical band pass filter are +10 GHz and −10 GHz, respectively. Here, the frequency deviation of +10 GHz corresponds to the change of the wavelength of −0.08 nm.

Figure 16:
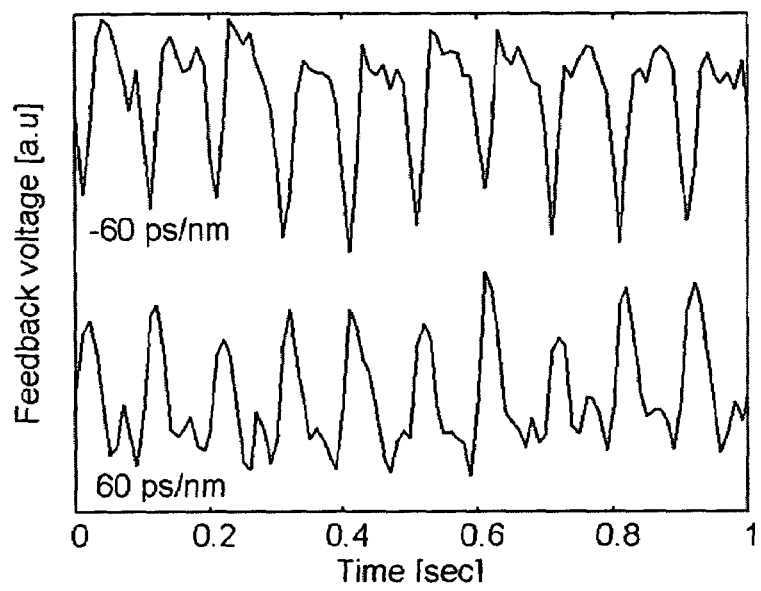
FIG. 16 is the waveform chart showing a waveform example of a phase modulation component detected by a PLL circuit in accordance with time passed in the first experimental example.

FIG. 16 shows the example the waveform of the phase modulation component, which is detected by the PLL circuit, in accordance with the time passed. This figure shows the example of the waveform of the phase modulation component of clock signal 211. In this figure, the axis of abscissa represents the time passed and the axis of ordinate shows the feedback voltage as PLL output signal 214 in FIG. 14. On the other hand, the waveform in the top end of the figure shows the case, where the dispersion value is −60 ps/nm and the waveform in the bottom end of the figure shows the case, where the dispersion value is +60 ps/nm.

PLL circuit 213 itself has a wide bandwidth to receive easily the noise. Therefore, a circuit noise and an optical signal noise of PLL circuit 213 causes deterioration of an S/N ratio (signal to noise ratio.) However, a sufficiently higher frequency component than the modulated component of acousto-optic tunable filter 203 does not influence the measurement accuracy and, hence, communication system 200 of the first experimental example employs a low pass filter, of which cutoff frequency is 50 kHz. By this, the noise in a high frequency band is eliminated to improve the S/N ratio. Though the waveform shown in FIG. 16 is expected to become ideally a rectangular wave, the waveform is blunted because the low pass filter cuts off simultaneously the high frequency band of the signal. However, an absolute value of the dispersion value is determined in the magnitude of the 10 kHz component and, thus, deterioration of the measurement accuracy caused by this can be neglected.

Figure 17:
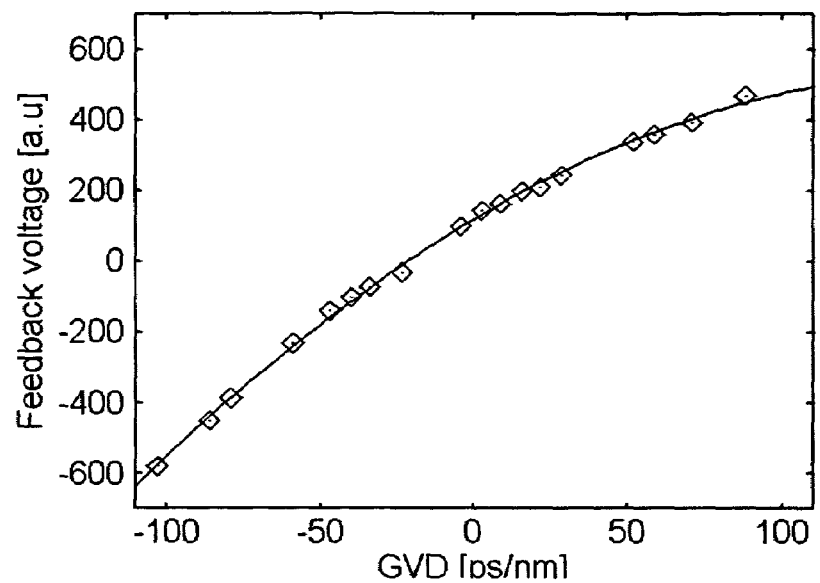
FIG. 17 is the figure showing a characteristic of a relation between a dispersion value of an optical fiber and a feedback voltage in the first experimental example.

FIG. 17 shows the relation between the dispersion value of the optical fiber and the feedback voltage as the detected phase modulation component. The axis of abscissa represents GVD (group velocity dispersion.) In other words, FIG. 17 shows the result of measurement of the magnitude of 10 kHz component of the phase modulation component of clock signal 211 for the dispersion value of the optical fiber 205 (FIG. 14.) In communication system 200 of the first experimental example in FIG. 14, the magnitude of the dispersion value is measured by using the amplitude of PLL output signal 214 output from PLL circuit 213. On the other hand, by a phase relation between PLL output signal 214 and acousto-optic tunable filter 203 as the optical band pass filter, or in other words, by delay or proceed of phase modulation component when the wavelength selected by acousto-optic tunable filter 203 is moved to a longer wavelength end, plus or minus of the sign is determined. As described above, the magnitude of the dispersion and the sign are separately determined. If the amplitude (the magnitude of the phase modulation component of clock signal 211) of PLL output signal 214 output from PLL circuit 213 is only measured, only the absolute value of the dispersion is known. The sign expressing plus or minus of the dispersion is important. Then, in FIG. 17, the magnitude of the dispersion and the sign are separately determined to express as the axis of ordinate. Meanwhile a position, where the magnitude of the phase modulation component of clock signal 211 is the minus, the sign is determined minus. From this figure, it can be known that in the position, where the dispersion is zero, the feedback voltage is not zero, offset occurs, and an accurate dispersion can be determined from the magnitude of the phase modulation component of the clock signal. The dispersion was measured in a range from about −100 ps/nm to +90 ps/nm. This limitation was caused by the range, in which the clock recovery module as clock extraction module 174 can normally extract clock signal 175.

Second Experimental Example

From the first experimental example as described above, it can be found that the dispersion of the optical fiber shown in FIG. 14 can be measured in high accuracy. As the second experimental example, it is described that these dispersion values can be measured in real time.

Figure 18:
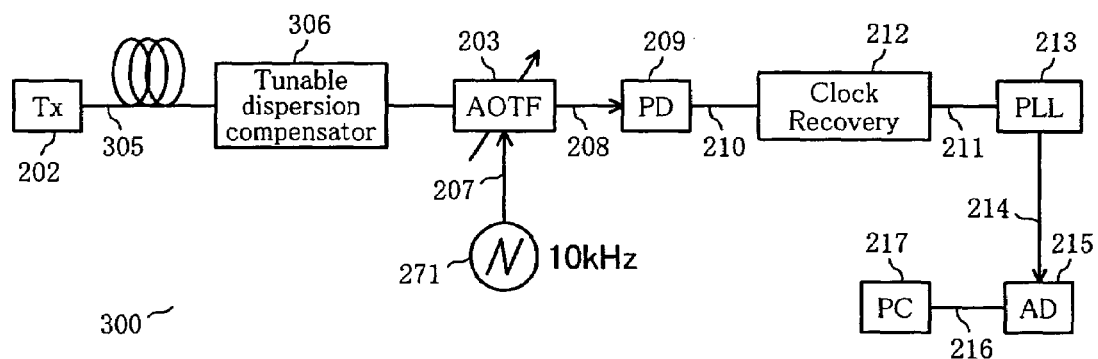
FIG. 18 is the system block diagram of the communication system used in the second experimental example.

FIG. 18 shows the outline of the communication system used in the second experimental example. The same reference numeral is attached to the part identical with that of FIG. 14 and, thus, description of the part is omitted properly. In communication system 300 of the second experimental example as the embodiment of the in-service optical pulse evaluation device of the third example, optical fiber 305 is serially connected to tunable dispersion compensator 306 between optical pulse transmitter (TX) 202 and acousto-optic tunable filter 203. Optical fiber 305 is a single mode fiber having the dispersion value of 253 ps/nm. Tunable dispersion compensator 306 used was a comparable with the tunable dispersion compensator using temperature-controlled chirped fiber grating (S. Matsumoto et al., IEEE Photon. Technol. Lett. Vol. 13, no. 8, August 2001.) Behavior, when a specified dispersion value of tunable dispersion compensator 306 was changed from −193 ps/nm (total dispersion 60 psi nm) to −313 ps/nm (total dispersion −60 psi nm) and returned from −193 ps/nm to −313 ps/nm, was monitored by the in-service optical pulse evaluation device. A measurement interval was defined almost 150 msec.

Figure 19:
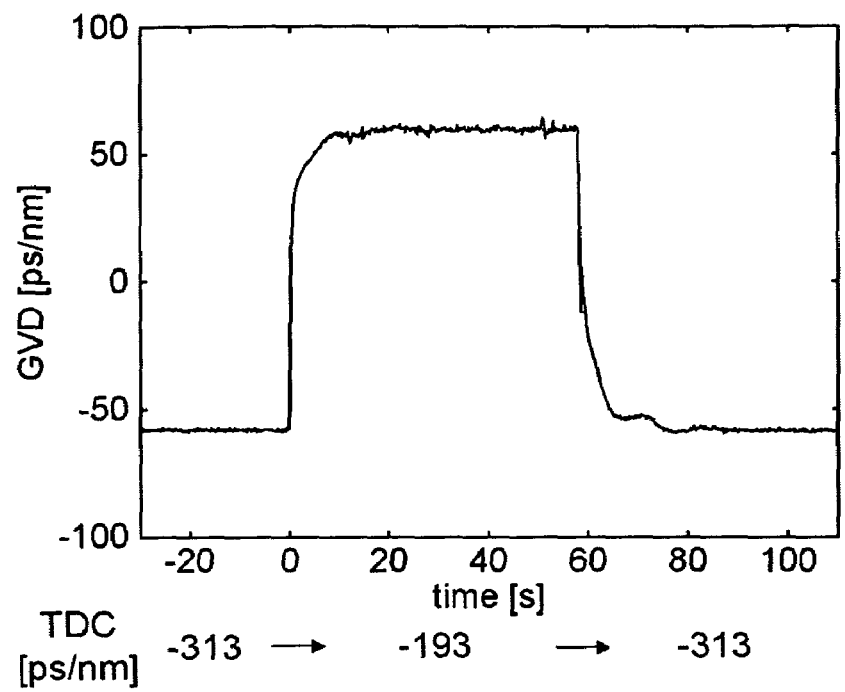
FIG. 19 is the figure showing the characteristic of the example of measurement of a transient response of a tunable dispersion compensator in the second experimental example.

FIG. 19 shows the example of measurement of the transient response of the tunable dispersion compensator in the second experimental example. The axis of abscissa represents the time passed since the specified dispersion value of tunable dispersion compensator 306 was changed from −313 ps/nm to −193 ps/nm. The axis of abscissa expresses GVD (group velocity dispersion.) The specified value was returned from −193 ps/nm to −313 ps/nm at 60 sec. The behavior of convergence on the specified dispersion value for 10 seconds and, therefore, it was observed that high dispersion can be accurately monitored.

In the second experimental example, when the measurement time was shortened up to 10 msec being the limit of the performance of AD converter 215, monitoring was possible. As described above, communication system 300 of the second experimental example can be used not only for a simple chirp measurement of the optical pulse, but also as a real time dispersion monitor by using the transmission signal.

Third Experimental Example

As described above, it is known that the in-service optical pulse evaluation device according to the present invention can measure the dispersion of the optical fiber in the high velocity, accurately, and in a wide range and, also, is suitable for the real time dispersion monitor. In the third experimental example, a simple optical network is practically made and the adaptive dispersion compensation system is built up in combination of the real time dispersion monitor with the tunable dispersion compensator according to the present invention.

Figure 20:
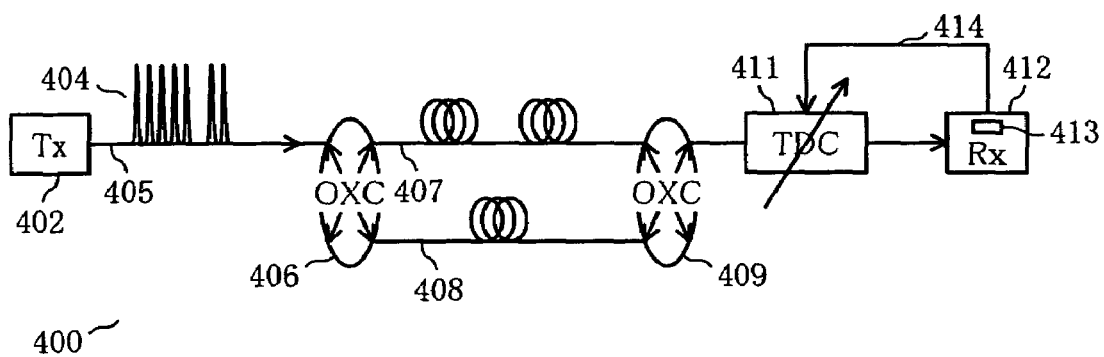
FIG. 20 is the system block diagram of an outline of the communication system used in the third experimental example.

FIG. 20 shows the outline of the communication system used in the third experimental example. Communication system 400 of the third experimental example being an embodiment of the in-service optical pulse evaluation device of the third example has transmitter (Tx) 402 for sending RZ signal 404 of 40 Gbps. The constitution of transmitter (Tx) 402 is same as that of optical pulse transmitter (TX) 202 of FIG. 14. Signal light 404 sent from transmitter (Tx) 402 is input in first optical cross connect node (OXC) 406 as a light exchanger to select any one end of first path 407 or second path 408. First path 407 comprises the single mode fiber having a length of 14 km, of which dispersion value is 223 ps/nm. Second path 408 comprises the single mode fiber having a length of 17 km, of which dispersion value is 280 ps/nm. To the other ends of first path 407 or second path 408 is selectively connected an input end of second optical cross connect node 409 as the light exchanger.

To an output end of second optical cross connect node 409 is connected a receiver (Rx) 412 through tunable dispersion compensator 411 using a temperature control type CFBG (Chirped Fiber Bragg Grating) capable of adjusting the specified dispersion value In receiver 412, real time dispersion monitor 413 is incorporated. Receiver 412 supplies dispersion value 414, which is output from this real time dispersion monitor 413, to tunable dispersion compensator 411 and, by this, operates the feedback control to make the dispersion zero. By using this communication system 400 of 40 Gbps, in order to measure a dispersion tolerance, the total dispersion value from transmitter 402 to receiver 412 is changed to measure a bit error rate (BER:) by the receiving end.

Figure 21:
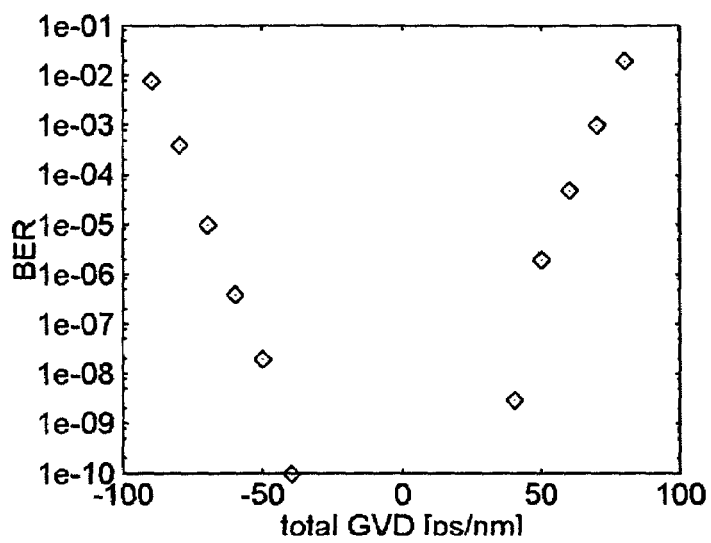
FIG. 21 is the figure showing the characteristic of result of measurement of a bit error rate in the third experimental example.

FIG. 21 shows the result of measurement of this bit error rate. The axis of abscissa expresses the change of the total dispersion value and the axis of ordinate expresses the bit error rate. The dispersion tolerance was about ±30 ps/nm.

Next, during actual working of the adaptive dispersion compensation system, paths 407 and 408 are switched by first optical cross connect node 406 and second optical cross connect node 409 to count error number for the period. The time necessary for switching paths 407 and 408 was 10 or fewer msec. The measurement time of the real time dispersion monitor 413 was 150 msec and the error number counting interval was 500 msec.

Figure 22:
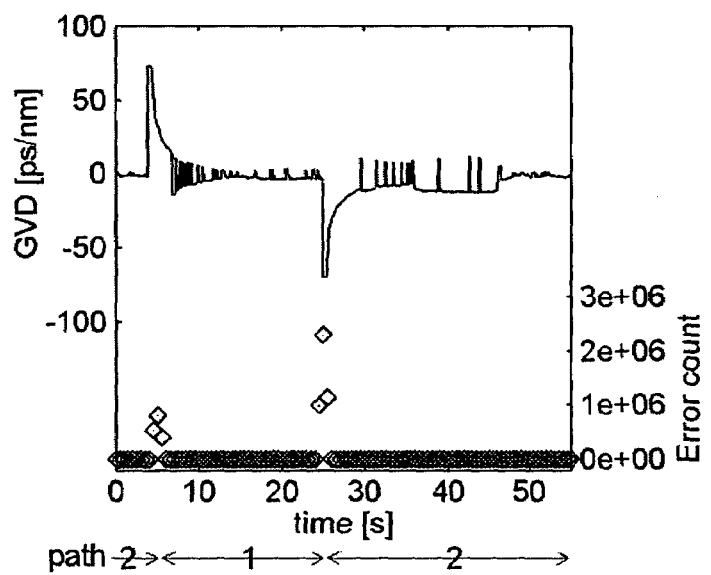
FIG. 22 is the figure showing the characteristic of a temporal change of the dispersion value and an error count resulted from an adaptive dispersion compensation experiment in the third experimental example.

FIG. 22 shows the temporal change of the dispersion value and the error count resulted from the adaptive dispersion compensation experiment. The axis of ordinate expresses the time passed and the top and the bottom of the axis of abscissa expresses the dispersion value measured by real time dispersion monitor 413 and the counted error number, respectively. "Path 2" of this figure means second path 408 and "path 1" means first path 407. In the point in which 5 sec passed, second path 408 is switched to first path 407 and, in the point in which 25 sec passed, first path 407 is again switched to second path 408. In either operations, the error free status was recovered within 1.5 sec. 1.35 sec excluding 150 msec being the measurement time of real time dispersion monitor 413 is the time required by the change to the specified dispersion value of tunable dispersion compensator 411. From this figure, it appears that the accuracy of the measured dispersion value is somewhat bad. This is because the relationship between the dispersion value and the feedback voltage is subjected to linear approximation in real time dispersion monitor 413 and also because the specified dispersion value of tunable dispersion compensator 411 produced the error.

What is claimed is:

1. An optical pulse evaluation device comprising:
an optical pulse outputting means for outputting an optical pulse to be evaluated;
an optical dividing means for dividing an optical pulse output from said optical pulse outputting means;
an optical frequency component extracting means for inputting one of the optical pulses divided by said optical dividing means to extract a specific optical frequency component;
a frequency component intensity measurement means for measuring an intensity of the specific optical frequency component of the optical pulse extracted by said optical frequency component extracting means;
a whole optical intensity measurement means for measuring an intensity of the other optical pulse divided by said optical dividing means; and
a phase intensity processing means for calculating a spectral phase and a spectral intensity of the optical pulse output from said optical pulse output means on the basis of a comparison between a measurement result of said frequency component intensity measurement means and the whole optical intensity measurement means.

2. The optical pulse evaluation device according to claim 1, wherein said optical pulse outputting means comprises a frequency defining means for defining a repetition frequency of a pulse train and a pulse light source for modulating a continuum by the repetition frequency defined by said frequency defining means to output as the pulse train.

3. The optical pulse evaluation device according to claim 1, having an error eliminating means for eliminating an error, which is produced by the dispersion and transmittance characteristic of said optical frequency component extracting means, by arithmetic operation.

4. The optical pulse evaluation device according to claim 1, wherein:

said optical frequency component extracting means is a band pass filter and has a band scanning means for changing sequentially the specific optical frequency component, which is extracted by said band pass filter, across at least a partial band of the whole frequency band of said optical pulse; and said phase intensity operating means calculates a waveform of said optical pulse on the basis of the spectral phase and the spectral intensity in individual optical frequency components obtained from a scanning result by said band scanning means.

5. The optical pulse evaluation device according to claim 4, having a secondary operating means for operating at least any one of a pulse width, a chirping, a dispersion, and a phase shift of said optical pulse by using the spectral phase and the spectral intensity obtained by said phase intensity operating means.

6. The optical pulse evaluation device according to claim 5, further having a measurement sample locating means for locating a measurement sample mountably and unmountably in a light path linking said optical pulse outputting means to said frequency component intensity measurement means; and a sample operating means for operating at least any one of (chirping, a dispersion, and a phase shift, which is cased by said measurement sample, of a reference optical pulse) and (a transmittance characteristic, dispersion, and a nonlinear effect of said measurement sample) by using an operation result of aid phase intensity operating means in a state where said measurement sample is located and teh state where not located in said light path.

7. The optical pulse evaluation device according to claim 1, wherein said optical pulse outputting means is a means for outputting the optical pulse, of which light intensity or phase is modulated by a digital data signal.

8. The optical pulse evaluation device according to claim 7, wherein said digital data signal contains a pseudo random signal.

9. The optical pulse evaluation device according to claim 7, further having:

a clock extraction means for extracting a clock signal synchronized with said digital data signal on the basis of the measurement result by said frequency component intensity measurement means;

a phase change detection means for detecting a phase change of said clock signal extracted by said clock extraction means;

a spectrum phase operating means for calculating a spectral phase from a phase change detected by said phase change detection means.

10. The optical pulse evaluation device according to claim 1, wherein said optical pulse outputting means is a means for outputting an optical pulse, of which light intensity or phase is modulated by a digital data signal, said optical frequency component extracting means is a band pass filer, and further having a band scanning means for changing sequentially the specific optical frequency component, which is extracted by said band pass filter, across at least a partial band of a whole frequency bands of said optical pulse; and a spectral phase operating means for calculating a spectral phase of an optical pulse train by extracting a repetition frequency component of band scanning from a phase change of a clock signal yielded by a scanning result by said band scanning means.

11. The optical pulse evaluation device according to claim 10, having a chirping operating means for calculating a chirping of said optical pulse by using the spectrum phase operated by said spectrum phase operating means.

* * * * *